US012804556B2

(12) United States Patent
Khoshnevisan et al.

(10) Patent No.: US 12,804,556 B2
(45) Date of Patent: Nov. 17, 2026

(54) POWER CONTROL FOR REFERENCE SIGNAL IN UPLINK DENSE DEPLOYMENT

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Yitao Chen, San Marcos, CA (US); Shaozhen Guo, Beijing (CN)

(73) Assignee: QUALCOMM Incorproated, San Diego, CA (US)

(*) Notice: Subject to any disclaimer, the term of this patent is extended or adjusted under 35 U.S.C. 154(b) by 328 days.

(21) Appl. No.: 18/576,571

(22) PCT Filed: Aug. 17, 2021

(86) PCT No.: PCT/CN2021/112917

§ 371 (c)(1),
(2) Date: Jan. 4, 2024

(87) PCT Pub. No.: WO2023/019419

PCT Pub. Date: Feb. 23, 2023

(65) Prior Publication Data

US 2024/0397443 A1 Nov. 28, 2024

(51) Int. Cl.
*H04W 52/32* (2009.01)
*H04W 52/08* (2009.01)
*H04W 52/24* (2009.01)

(52) U.S. Cl.
CPC ......... *H04W 52/325* (2013.01); *H04W 52/08* (2013.01); *H04W 52/242* (2013.01)

(58) Field of Classification Search
CPC . H04W 52/325; H04W 52/08; H04W 52/242; H04W 48/16; H04W 52/42;
(Continued)

(56) References Cited

U.S. PATENT DOCUMENTS 6,760,847 B1 * 7/2004 Liu .......................... H04M 3/34 713/300
11,457,414 B2 * 9/2022 Yao ...................... H04W 52/245
(Continued)

FOREIGN PATENT DOCUMENTS

WO WO-2017166249 A1 * 10/2017 ............ H04W 72/04
WO WO-2021155541 A1 * 8/2021 .......... H04W 52/325

OTHER PUBLICATIONS

CN 109819455 A, Li, May 28, 2019, all (Year: 2019).*
International Search Report and Written Opinion—PCT/CN2021/112917—ISA/EPO—Feb. 7, 2022.

*Primary Examiner* — Curtis A Kuntz
(74) *Attorney, Agent, or Firm* — Shumaker & Sieffert, P.A.

(57) ABSTRACT

Aspects of the disclosure relate to power control for reference signals, such as a sounding reference signal (SRS) in an uplink (UL) dense deployment. A user equipment (UE) may receive, via a transceiver, an indication of a power spectral density for a sounding reference signal (SRS) from a base station. The UE may then transmit, via the transceiver, the SRS at a power level that is based on the power spectral density. The base station may then receive, from an uplink (UL) receive point via the communication interface, an indication of a measured power of the SRS received by the UL receive point from the UE. The base station may then transmit, to the UE, an UL transmitter configuration based on the indication of the measured power of the SRS. Other aspects, embodiments, and features are also claimed and described.

26 Claims, 12 Drawing Sheets

(58) Field of Classification Search
CPC . H04W 84/047; H04W 52/146; H04W 72/21; H04W 72/232; H04B 7/06966
See application file for complete search history.

(56) References Cited

U.S. PATENT DOCUMENTS

| | | | | |
|---|---|---|---|---|
| 2011/0110261 | A1 | 5/2011 | Frenger | |
| 2011/0136484 | A1 | 6/2011 | Braun et al. | |
| 2014/0126440 | A1* | 5/2014 | Frank | H04W 52/146 370/311 |
| 2014/0334331 | A1 | 11/2014 | Wager et al. | |
| 2019/0387477 | A1 | 12/2019 | McCoy et al. | |
| 2020/0137592 | A1 | 4/2020 | Guo et al. | |
| 2020/0374814 | A1 | 11/2020 | Gong et al. | |
| 2022/0124796 | A1* | 4/2022 | Salem | H04W 74/02 |
| 2022/0353031 | A1* | 11/2022 | Khoshnevisan | H04L 5/0053 |

* cited by examiner

FIG. 7B
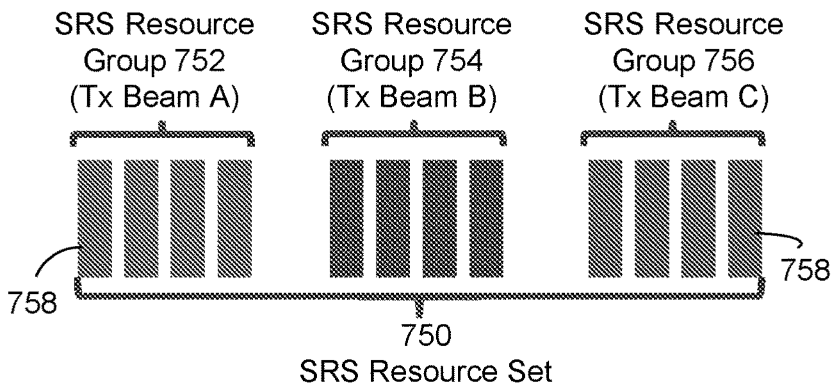
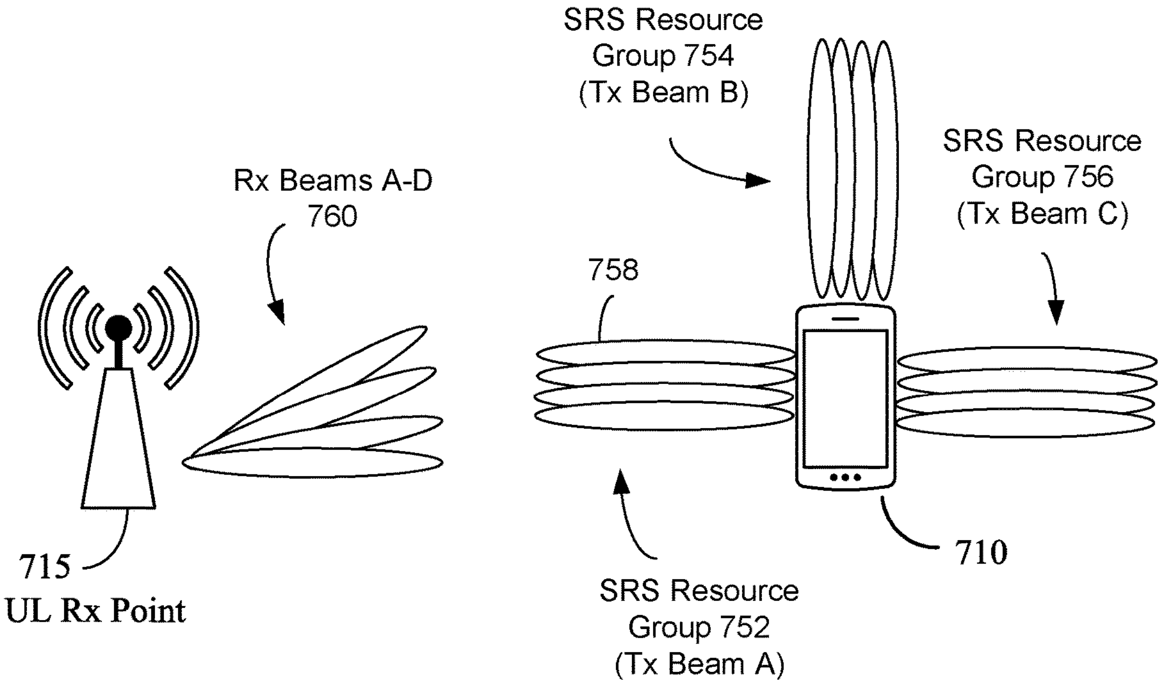
FIG. 7C

POWER CONTROL FOR REFERENCE SIGNAL IN UPLINK DENSE DEPLOYMENT

This application is a national stage application under 35 U.S.C. § 371 of PCT Application No. PCT/CN2021/112917, filed Aug. 17, 2021. The entire content of PCT Application No. PCT/CN2021/112917 is incorporated herein by reference in its entirety.

TECHNICAL FIELD

The technology discussed below relates generally to wireless communication systems, and more particularly, to uplink (UL) power levels for reference signals in communication systems with an UL dense deployment.

INTRODUCTION

User equipment (UEs) in a communication system may set and adjust transmission power levels for uplink (UL) communications to a base station based on measurements of downlink (DL) communications received from the base station. By setting and adjusting the transmission power, UEs may avoid transmissions that use more power than necessary to be received by a base station, and may avoid transmission that are at too low of a power level to be received by a base station.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some scenarios, determining a power level for an uplink (UL) communication based on a measurement of a downlink (DL) communication results in an UL power level that is excessive or inadequate. For example, when the UL communication may be transmitted to an UL receive (Rx) point other than the base station providing the DL communication, an UL power level based on measurements of the DL communication may be higher or lower than necessary or desired for reception. Such a scenario may occur when a UE is an area of an UL dense deployment. For example, when initially acquiring access or during a beam recovery in an UL dense deployment, the UE may transmit a sounding reference signal (SRS) as an UL communication. However, a particular UL Rx point that may receive the SRS from a UE may be unknown to the UE, the base station, and the UL Rx point. Further, UL Rx points may not transmit DL communications from which a UE may measure or estimate path-loss. Accordingly, estimating path-loss to the UL Rx point for setting a power level for the SRS may be difficult and, when based on a measured path-loss of the DL communication, inaccurate.

In some aspects, the present disclosure provides a process for a wireless communication device (e.g., a UE) to determine an UL power level for an SRS in an UL dense deployment based on a power spectral density indicated by the base station. Determining the UL power level in this manner may improve processing efficiency by reducing the complexity of the power level calculation. Additionally, the UE may avoid a calculation that would otherwise be based on a path-loss of a DL communication that may lead to a power level that is higher or lower than necessary or desired.

In one example, an apparatus for wireless communication is disclosed. The apparatus includes a processor, a transceiver communicatively coupled to the processor, and a memory communicatively coupled to the processor. The apparatus is configured to receive, via the transceiver, an indication of a power spectral density for a sounding reference signal (SRS). The apparatus is further configured to transmit, via the transceiver, the SRS at a power level that is based on the power spectral density.

In one example, a method for wireless communication is disclosed. The method includes receiving an indication of a power spectral density for a sounding reference signal (SRS). The method further includes transmitting the SRS at a power level that is based on the power spectral density.

In one example, an apparatus for wireless communication is disclosed. The apparatus includes a processor, a communication interface communicatively coupled to the processor, and a memory communicatively coupled to the processor. The apparatus is configured to transmit, to a user equipment (UE) via the communication interface, an indication of a power spectral density for a sounding reference signal (SRS). The apparatus is further configured to receive, from an uplink (UL) receive point via the communication interface, an indication of a measured power of the SRS received by the UL receive point. The apparatus is also configured to transmit, to the UE via the communication interface, an UL transmitter configuration based on the indication of the measured power of the SRS.

In one example, a method for wireless communication is disclosed. The method includes transmitting, to a user equipment (UE), an indication of a power spectral density for a sounding reference signal (SRS). The method further includes receiving, from an uplink (UL) receive point, an indication of a measured power of the SRS received by the UL receive point. The method also includes transmitting, to the UE, an UL transmitter configuration based on the indication of the measured power of the SRS.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

BRIEF DESCRIPTION OF THE DRAWINGS

FIG. 7B is a diagram of a sounding reference signal (SRS) set according to some embodiments.

FIG. 7C is an illustration of an SRS set transmission according to some embodiments.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, aggregated devices, disaggregated arrangements, end-user devices, etc. of varying sizes, shapes, and constitution.

Figure 1:
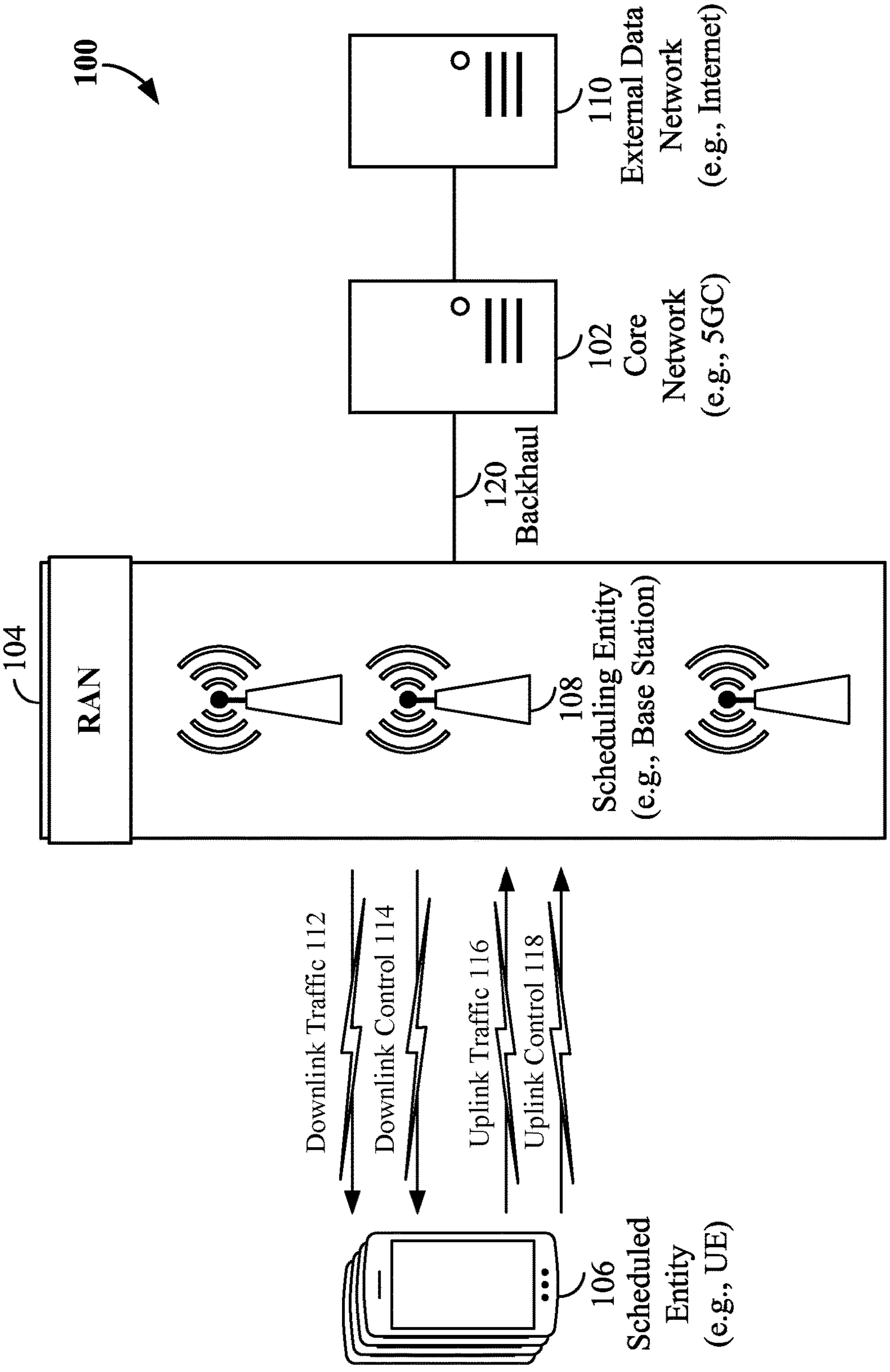
FIG. 1 is a schematic illustration of a wireless communication system according to some embodiments.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a mobile apparatus or UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (also referred to as a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. In some deployments, for example, a scheduling entity (e.g., a base station 108) allocates resources for communication among some or all devices and equipment within its service area or cell. A scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). Other devices may also perform scheduling operations or aid in facilitating scheduling operations.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
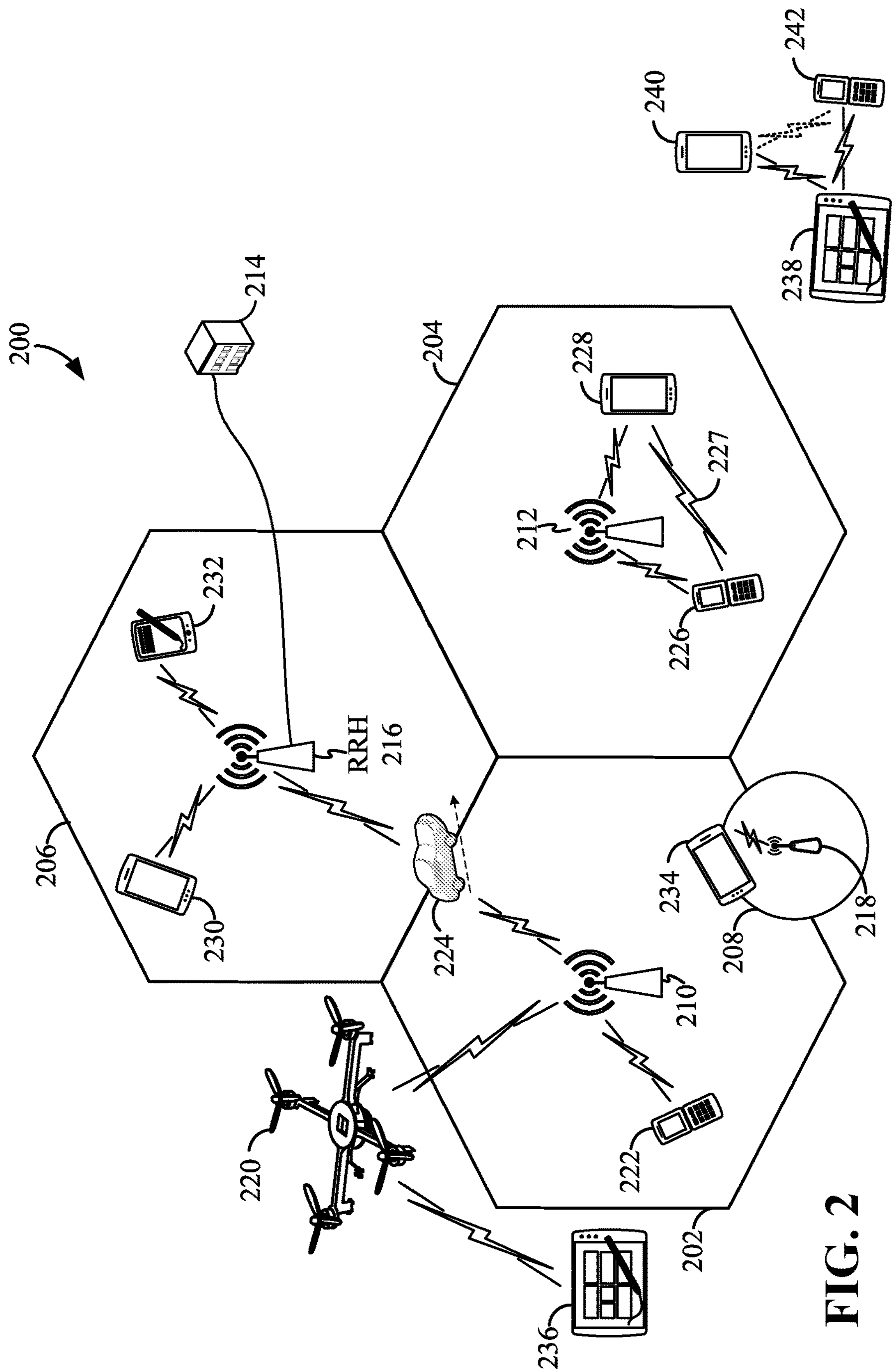
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell may be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.)

which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Figure 3:
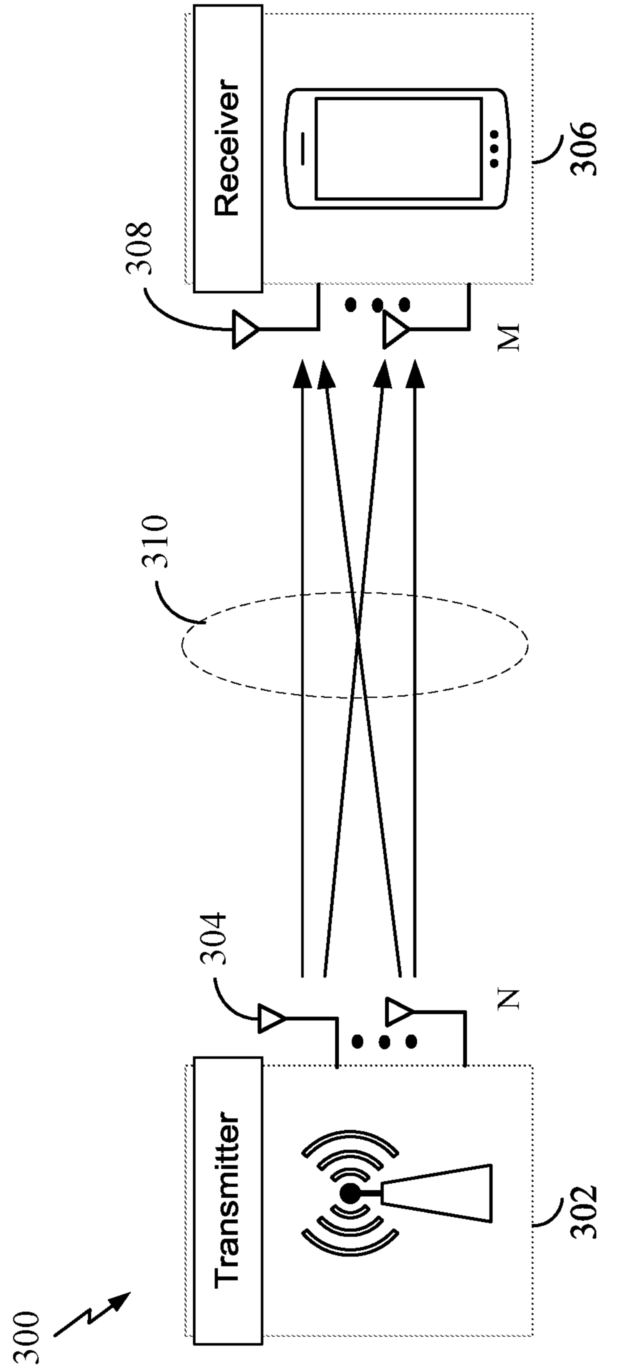
FIG. 3 is a block diagram illustrating a wireless communication system supporting multiple-input multiple-output (MIMO) communication according to some embodiments.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In one example case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

Figure 4:
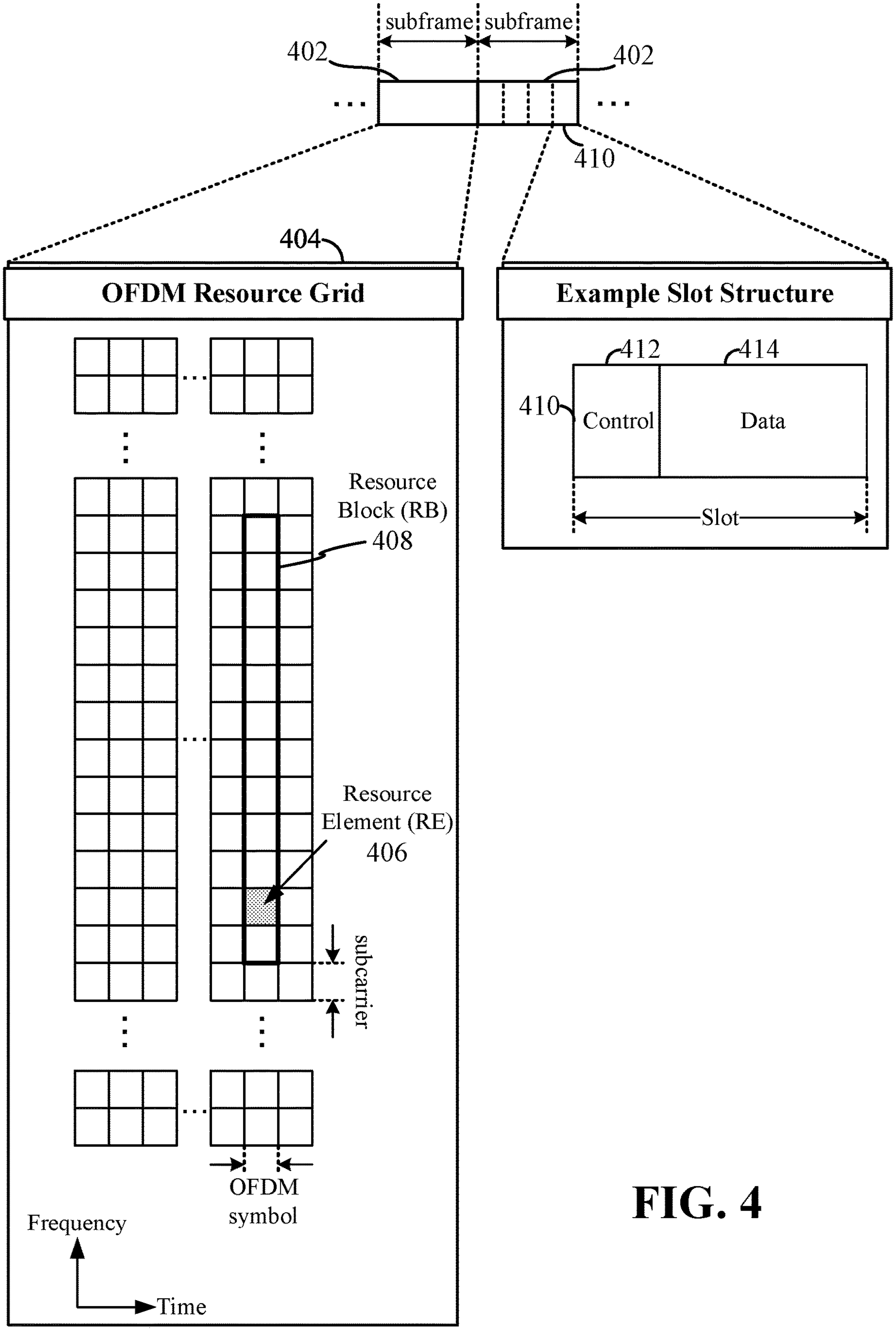
FIG. 4 is a schematic illustration of an organization of wireless resources in an air interface utilizing orthogonal frequency divisional multiplexing (OFDM) according to some embodiments.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is illustrated in the horizontal direction with units of OFDM symbols; and frequency is illustrated in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 408 entirely corresponds to a single direction of communication (either transmission or reception for a given device).

A UE generally utilizes only a subset of the resource grid 404. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

In some deployments, each subframe 402 (e.g., a 1 ms subframe) may consist of one or multiple adjacent slots. In FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, various REs 406 within an RB 408 may carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, a transmitting device (e.g., the scheduling entity 108) may allocate one or more REs 406 (e.g., within a control region 412) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit the synchronization signals PSS and SSS (collectively referred to as SS) and/or the PBCH in an SS block. The SS block may includes four consecutive OFDM symbols. The four consecutive symbols may be numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In some examples, a physical layer may generally multiplex and map these physical channels described above to transport channels for handling at a medium access control (MAC) layer entity. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be inversely proportional to the symbol period. A numerology of an OFDM waveform refers to its particular configuration for subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
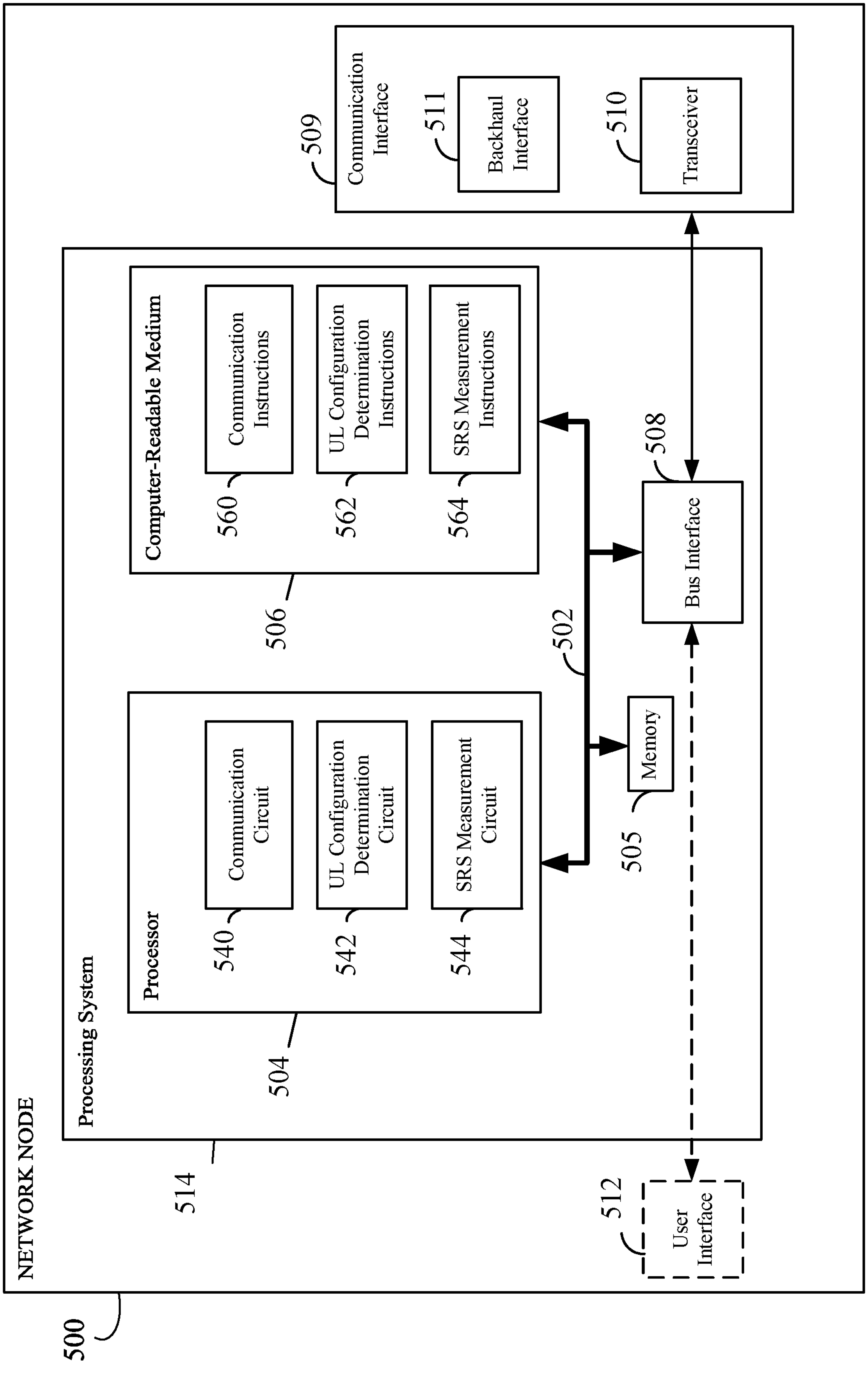
FIG. 5 is a block diagram conceptually illustrating an example of a hardware implementation for a network node according to some embodiments.

FIG. 5 is a block diagram illustrating an example of a hardware implementation for a network node 500 employing a processing system 514. For example, the network node 500 may be a scheduling entity (e.g., a base station) or an uplink reception point (UL Rx point, described below), as illustrated in any one or more of FIGS. 1, 2, 3, 7A, 7C, and 7D. In another example, the network node 500 may be a user equipment as illustrated in any one or more of FIGS. 1, 2, 3, 7A, 7C, and 7D.

The network node 500 may include a processing system 514 having one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 500 may be configured to perform any one or more of the functions described herein. That is, the processor 504, as utilized in a network node 500, may be configured (e.g., in coordination with the memory 505) to implement any one or more of the processes and procedures described below and illustrated in FIGS. 7D, 8, and 10.

The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a communication interface 509. The communication interface 509 may include one or both of a transceiver 510 and a backhaul interface 511. The transceiver 510 provides a communication interface or means for communicating with various other apparatus over a transmission medium. For example, when the network node 500 is a base station or other scheduling entity, the network node 500 may wirelessly communicate with a scheduled entity (e.g., a UE) and/or an UL Rx point (see, e.g., UL Rx points of FIG. 7A). In some examples, in addition to or instead of communicating with UL Rx point(s) via the transceiver 510, the network node 500 communicates with one or more UL Rx points via the backhaul interface 511. The backhaul interface 511 may provide a wired connection to one or more UL Rx points or a separate wireless connection to the UL Rx points. As a further example, when the network node 500 is an UL Rx point, the network node 500 may wirelessly communicate with a scheduled entity (e.g., a UE) and/or a scheduling entity (e.g., a base station). In some examples, in addition to or instead of communicating with the scheduling entity via the transceiver 510, the network node 500 communicates with the scheduling entity via the backhaul interface 511. The backhaul interface 511 may provide a wired connection to the scheduling entity or a separate wireless connection to the scheduling entity. Depending upon the nature of the apparatus, a user interface 512 (e.g., keypad, display, speaker, microphone, joystick) may also be provided. Of course, such a user interface 512 is optional, and some examples, such as a base station, may omit it.

In some aspects of the disclosure, the processor 504 may include communication circuitry 540 configured (e.g., in coordination with the memory 505) for various functions, including, e.g., determining and transmitting indications of power spectral density to scheduled entities, transmitting downlink communications to scheduled entities and receiving uplink communications from scheduled entities directly or indirectly via an UL receive (Rx) point, receiving power level measurements for reference signals from UL Rx points, transmitting UL transmitter configurations, transmitting UL receiver selections, transmitting UL receiver configurations, receiving UL receiver selections, and receiving UL receiver configurations. For example, the communication circuitry 540 may be configured to implement one or more of the functions described below in relation to FIG. 7D including, e.g., the communications of power spectral density (PSD) 772, SRS 776, UL transmitter configuration 784, UL receiver selection 786, UL receiver configuration 788, and/or in relation to FIG. 10 including, e.g., blocks 1005, 1010, and 1015.

In some aspects of the disclosure, the processor 504 may include UL configuration determination circuitry 542 configured (e.g., in coordination with the memory 505) for various functions, including, e.g., determining UL configurations. For example, the determination circuitry 542 may be configured to implement one or more of the functions described below in relation to FIG. 7D including, e.g., block 782, and/or in relation to FIG. 10, including, e.g., block 1015.

In some aspects of the disclosure, the processor 504 may include sounding reference signal (SRS) measurement circuitry 544 configured (e.g., in coordination with the memory 505) for various functions, including, e.g., measuring a power level of a received SRS resource (e.g., from a scheduled entity). For example, the determination circuitry 542 may be configured to implement one or more of the functions described below in relation to FIG. 7D, including, e.g., block 778.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may store computer-executable code that includes communication instructions 560 that configure a network node 500 for various functions, including, e.g., determining and transmitting indications of power spectral density to scheduled entities, transmitting downlink communications to scheduled entities and receiving uplink communications from scheduled entities directly or indirectly via an UL receive (Rx) point, receiving power level measurements for reference signals from UL Rx points transmitting UL transmitter configurations, transmitting UL receiver selections, transmitting UL receiver configurations, receiving UL receiver selections, and receiving UL receiver configurations. For example, the communication instructions 560 may be configured to cause a network node 500 to implement one or more of the functions described below in relation to FIG. 7D including, e.g., the communications of power spectral density (PSD) 772, SRS 776, UL transmitter configuration 784, UL receiver selection 786, UL receiver configuration 788, and/or in relation to FIG. 10 including, e.g., blocks 1005, 1010, and 1015.

In one or more examples, the computer-readable storage medium 506 may store computer-executable code that includes UL configuration determination instructions 562 that configure a network node 500 for various functions, including, e.g., determining UL configurations. For example, the UL configuration determination instructions 562 may be configured to cause a network node 500 to implement one or more of the functions described below in relation to FIG. 7D including, e.g., block 782, and/or in relation to FIG. 10 including, e.g., block 1015.

In one or more examples, the computer-readable storage medium 506 may store computer-executable code that includes sounding reference signal (SRS) measurement instructions 564 that configure a network node 500 for various functions, including, e.g., determining and transmitting UL configurations. For example, the sounding reference signal (SRS) measurement instructions 564 may be configured to cause a network node 500 to implement one or more of the functions described below in relation to FIG. 7D including, e.g., block 778.

In one configuration, the network node 500 for wireless communication includes means for determining and transmitting indications of power spectral density to scheduled entities, means for transmitting downlink communications to scheduled entities and receiving uplink communications from scheduled entities directly or indirectly via an UL receive (Rx) point, means for receiving power level measurements for reference signals from UL Rx points, and means for determining and transmitting UL configurations, and/or means for measuring a power level of a received SRS resource. In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Figure 7A:
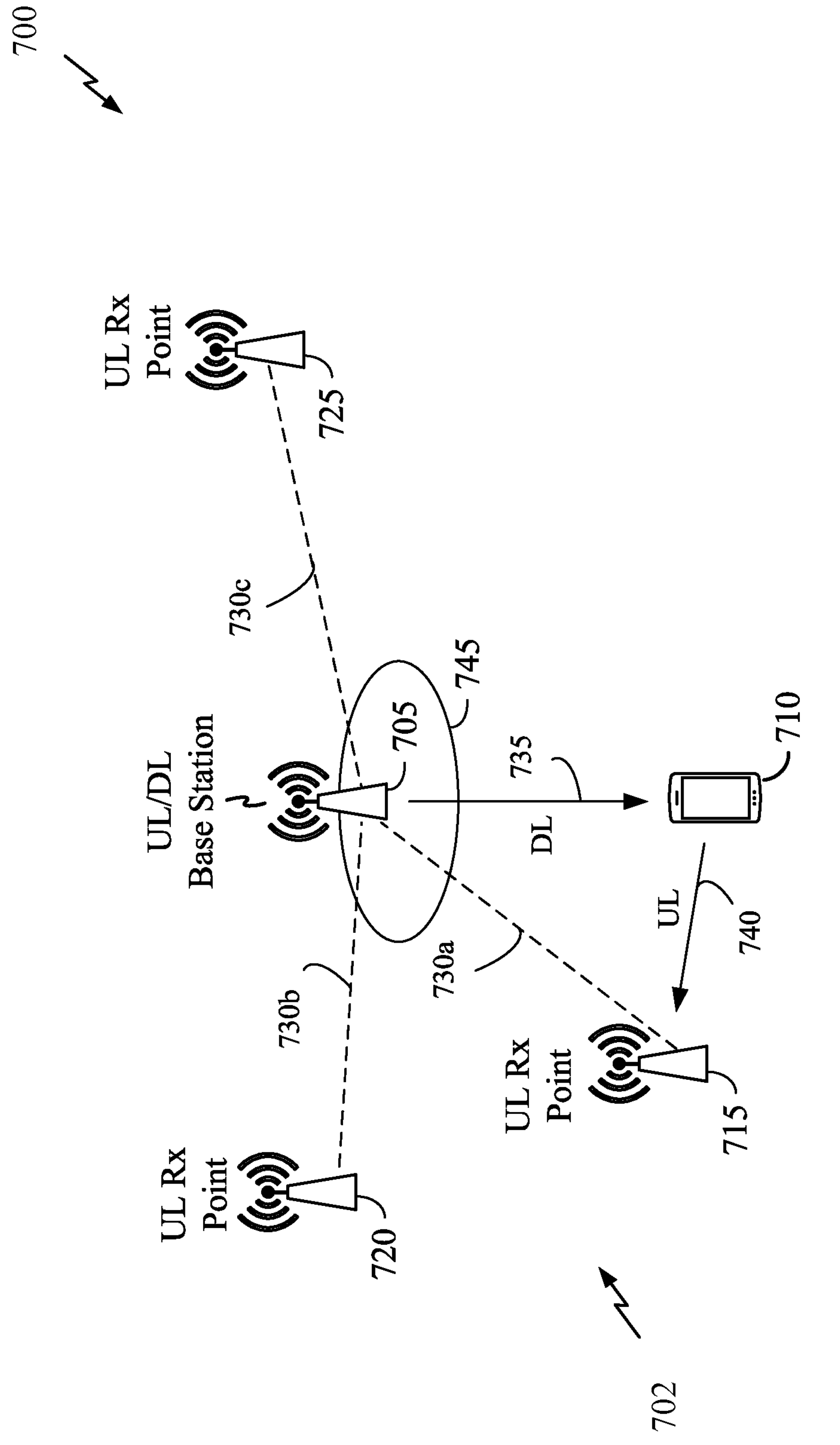
FIG. 7A is a conceptual illustration of a communication system including a base station, user equipment, and uplink (UL) receive (Rx) points according to some embodiments.
Figure 7D:
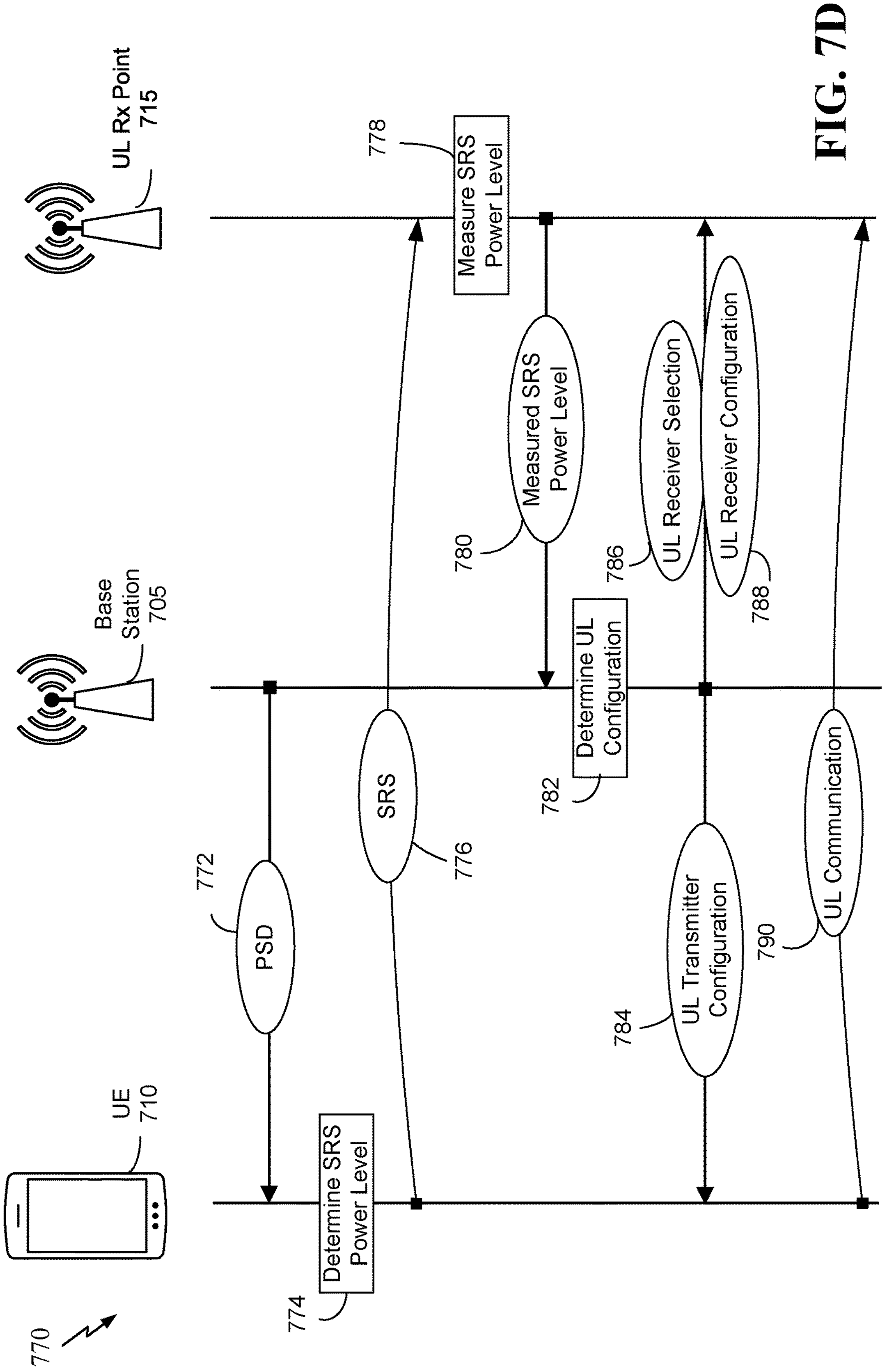
FIG. 7D is a sequence diagram for a beam management process according to some embodiments.
Figure 8:
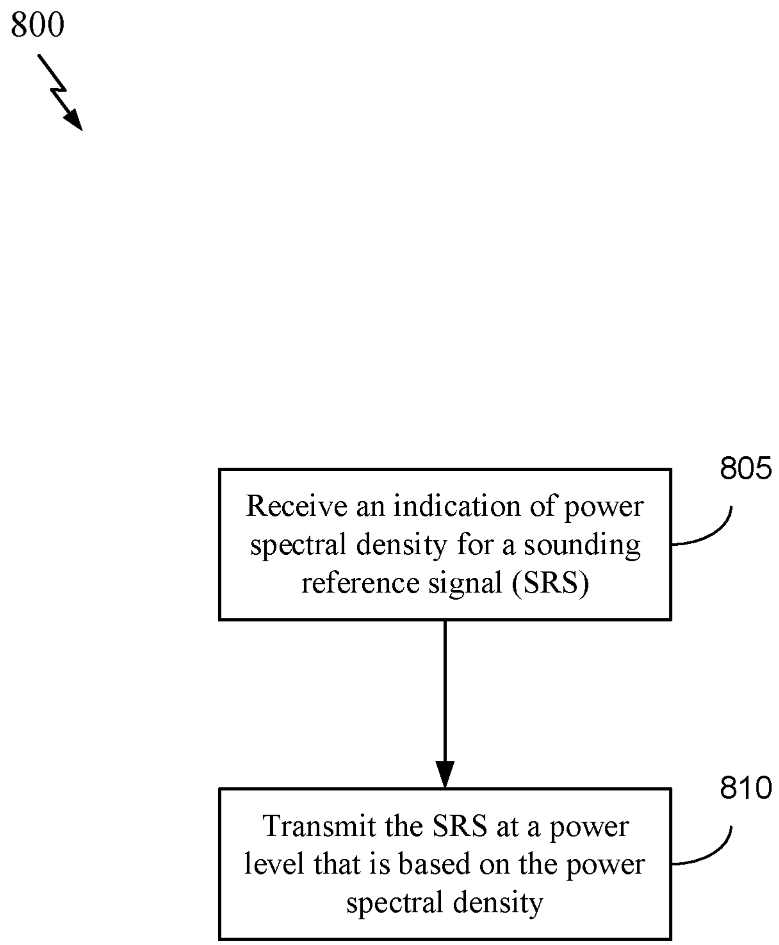
FIG. 8 is a flow chart illustrating an exemplary process for power control of uplink (UL) communication according to some embodiments.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, 3, 7A, and/or 7D, and utilizing, for example, the processes and/or algorithms described herein in relation to FIGS. 7D, 8, and/or 10.

Figure 6:
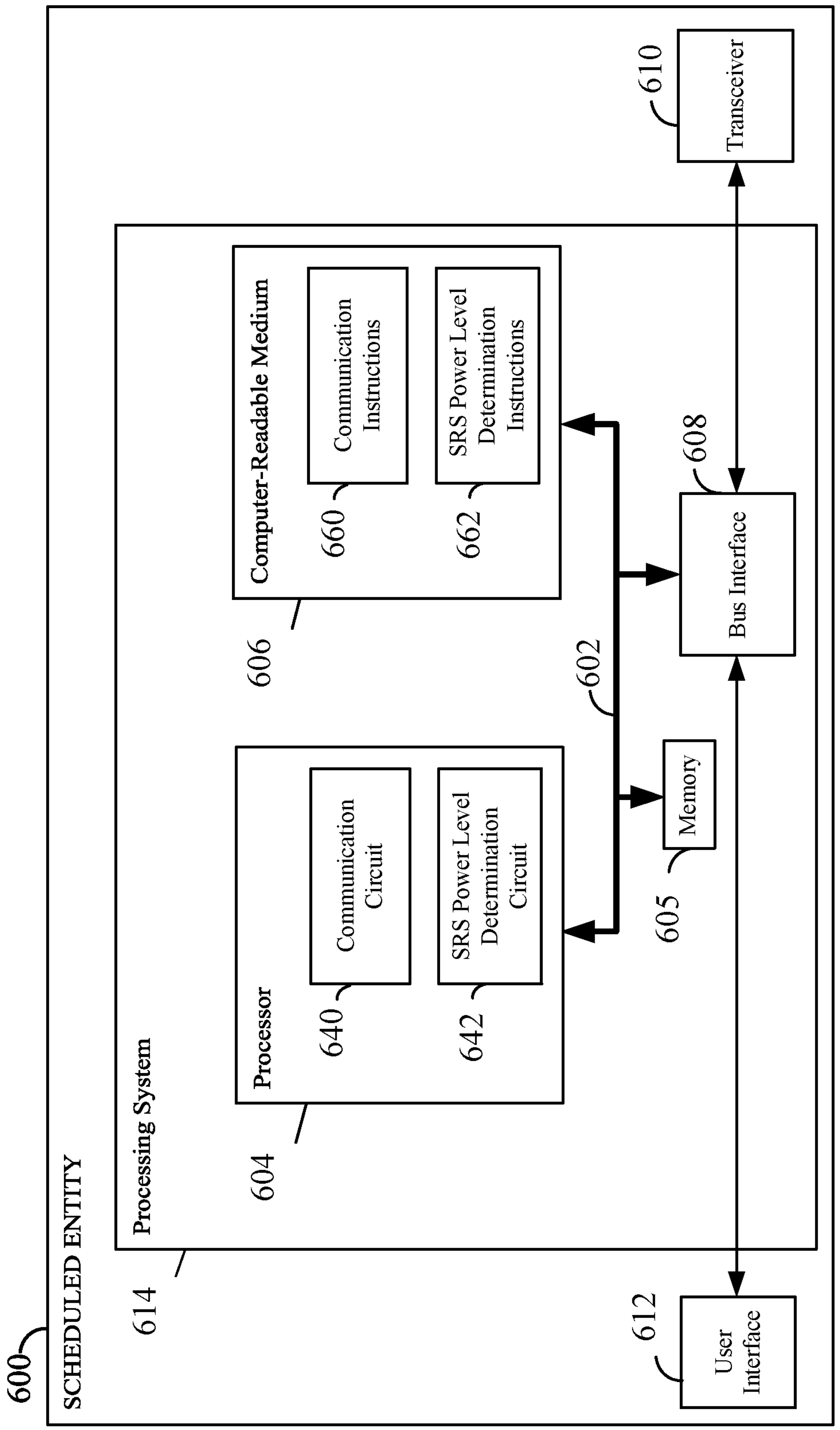
FIG. 6 is a block diagram conceptually illustrating an example of a hardware implementation for a scheduled entity according to some embodiments.

FIG. 6 is a conceptual diagram illustrating an example of a hardware implementation for an exemplary scheduled entity 600 employing a processing system 614. In accordance with various aspects of the disclosure, a processing system 614 may include an element, or any portion of an element, or any combination of elements having one or more processors 604. For example, the scheduled entity 600 may be a user equipment (UE) as illustrated in any one or more of FIGS. 1, 2, 3, 7A, 7C, and 7D.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be configured (e.g., in coordination with the memory 605) to implement any one or more of the processes described below and illustrated in FIGS. 7D and 8.

In some aspects of the disclosure, the processor 604 may include communication circuitry 640 configured (e.g., in coordination with the memory 605) for various functions, including, for example, receiving an indication of a power spectral density, transmitting an SRS, receiving an UL transmitter configuration, and transmitting an UL communication in accordance with the UL transmitter configuration. For example, the communication circuitry 640 may be configured to implement one or more of the functions described below in relation to FIG. 7D, including, e.g., transmitting and/or receiving of power spectral density (PSD) 772, SRS 776, and/or UL transmitter configuration 784, and/or in relation to FIG. 8, including, e.g., block 805 and/or 810.

In some aspects of the disclosure, the processor 604 may include SRS power level determination circuitry 642 configured (e.g., in coordination with the memory 605) for various functions, including, for example, to determine an SRS power level. For example, the SRS power level determination circuitry 642 may be configured to implement one or more of the functions described below in relation to FIG. 7D, including, e.g., block 774, and/or in relation to FIG. 8, including, e.g., block 810.

And further, the computer-readable storage medium 606 may store computer-executable code that includes communication instructions 660 that configure a scheduled entity 600 for various functions, including, e.g., receiving an indication of a power spectral density, transmitting an SRS, receiving an UL transmitter configuration, and transmitting an UL communication in accordance with the UL transmitter configuration. For example, the communication instructions 660 may be configured to cause a scheduled entity 600 to implement one or more of the functions described below in relation to FIG. 7D, including, e.g., transmitting and/or receiving of power spectral density (PSD) 772, SRS 776, and/or UL transmitter configuration 784, and/or in relation to FIG. 8, including, e.g., block 805 and/or 810.

The computer-readable storage medium 606 may store computer-executable code that includes SRS power level determination instructions 662 that configure a scheduled entity 600 for various functions, including, e.g., determining an SRS power level. For example, the SRS power level determination instructions 662 may be configured to cause a scheduled entity 600 to implement one or more of the functions described below in relation to FIG. 7D, including, e.g., block 774, and/or in relation to FIG. 8, including, e.g., block 810.

In one configuration, the scheduled entity 600 for wireless communication includes means for receiving an indication of a power spectral density, means for transmitting an SRS, means for receiving an UL transmitter configuration, means for transmitting an UL communication in accordance with the UL transmitter configuration and/or means for determining an SRS power level. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 7A, and/or 7D, and utilizing, for example, the processes and/or algorithms described herein in relation to FIGS. 7D, 8, and/or 10.

Uplink Power Control in Uplink Dense Deployment

FIG. 7A illustrates a communication system 700 including a radio area network (RAN) 702 that includes a scheduling entity 705, illustrated as a base station, configured for both uplink (UL) and downlink (DL) communications with scheduled entities including scheduled entity 710, illustrated as user equipment (UE). The description below refers to the scheduled entity 710 as a UE, and the scheduling entity 705 as a base station, although it can be appreciated that in other configurations other scheduled entities and scheduling entities could be substituted. The RAN 702 further includes uplink reception points (UL Rx points) 715, 720, and 725 that are configured to receive uplink communications from scheduled entities, such as the UE 710. The UL Rx points 715, 720, and 725 are connected by a backhaul network, which may be similar to the backhaul 120 of FIG. 1, and that includes backhaul connections 730*a*, 730*b*, and 730*c*. One or more of the base stations 705 and/or UL Rx points 715, 720, and 725 may be an implementation of the network node 500 of FIG. 5. The UE 728 may be an implementation of the scheduled entity 600 of FIG. 6.

The UL Rx points 715, 720, and 725 may be receive-only points that are configured to receive UL communications, but not downlink communications. In some examples, however, one or more of the UL Rx points 715, 720, and 725 may be configured to transmit at least some DL communications.

The RAN 702 is an example of a network having an UL dense deployment configured to improve one or both of UL coverage and UL capacity. More particularly, the one or more UL Rx points 715, 720, and 725 may be included within the RAN 702 to improve one or both of UL coverage and UL capacity. For example, the UE 710 may receive DL communications 735 transmitted by the base station 705. In some instances, however, the UE 710 may transmit UL communications 740 to the UL Rx point 715, rather than to the base station 705. The UL Rx point 715 may then transmit the UL communications 740, or at least the content thereof, to the base station 705 via the backhaul connection 730*a*.

An UL dense deployment, such as shown in FIG. 7A, can reduce the UL path-loss, which is helpful when UL coverage or UL capacity are a bottleneck for communications in the RAN 702. Additionally, expanding network capabilities of the RAN 702 by including an UL dense deployment of UL Rx points that receive UL communications, but do not transmit DL communications, can be less costly and less complex than expanding network capabilities by including further base stations configured for both UL and DL communications.

In some UL communications from the UE 710 to the base station 705, the UE 710 may select a power transmission level based on a measurement of a DL signal that the UE 710 has received from the base station 705. For example, the UE 710 may determine a path-loss variable for a DL signal based on a measurement of the DL signal (e.g., a DL reference signal). The UE 710 may then predict the path-loss that an UL communication to the base station 705 will experience based on the determined path-loss of the DL communication, and then determine a sufficient strength or power level for an UL communication to reach the base station 705.

Over time, as the UE 710 transmits UL communications to the base station 705, the UE 710 may determine to increase or decrease transmission power to a more desirable level for such UL communications, potentially improving reception (in the case of an increase) or reducing power consumption per transmission (in the case of a decrease). For example, the base station 705 may determine that the power level at the reception point of the UL communications (e.g., at the base station 705) is above a threshold indicating excessive power or below a threshold indicating inadequate power. In turn, the base station 705 may indicate to the UE 710 to decrease transmission power (if excessive) or increase transmission power (if inadequate). For example, the base station 705 may send transmit power control (TPC) commands indicating to increase, decrease, or leave unchanged the UL transmission power level. The base station 705 may send TPC commands regularly over the course of DL communications such that the transmission power level of the UE 710 is incrementally changed to a desired transmission power level. Further, the desired transmission power level may change over time, and the TPC commands may allow the UE 710 to follow the changing desired transmission power level.

The UE 710 may also determine different UL power levels for different types of UL communications. For example, the UE 710 may calculate a different UL power level for each of sounding reference signal (SRS) communications, PRACH communications, PUSCH communications, and PUCCH communications. For each of these types of UL communications, the UE 710 may use a specific UL power equation to calculate an associated UL power level for the type of UL communication. Additionally, the UE 710 may maintain one or more power control adjustment states, each associated with a particular type of UL communication. Each power control adjustment state may be, for example, a numerical value that is an accumulation of power commands, as described further below. The UL power equations may include a variable that is set equal to the numerical value of one of the power control adjustment states. For example, the UL power equation for an SRS communication may include a variable that is set equal to a power control adjustment state associated with SRS communications (also referred to as a closed loop SRS power control adjustment state).

The power control adjustment states may begin with or be reset to an initial value (e.g., zero in decibel-milliwatts (dBm)). The base station 705 may transmit power commands (e.g., TPC commands) that indicate to increment, decrement, or leave the power control adjustment state unchanged. The UE may then accumulate the power commands received from the base station for the particular power control adjustment state. The power commands may also be specific to a particular power control adjustment state. For example, an SRS TPC command may indicate to increase or decrease a SRS power control adjustment state, while a PRACH TPC command may indicate to the UE 710 to increase or decrease one of the PRACH power control adjustment states.

For some UL communications, such a procedure may result in a desirable UL power level. A desirable power level for an UL communication may refer to, for example, a power level that is not too low such that the UL communication is unlikely to be received and/or properly decoded by a base station, and that is not too high such that the UE is consuming excess power to transmit the UL communication.

However, path-loss for UL communications from the UE 710 to an UL Rx point (e.g., UL Rx point 715) may not correspond to path-loss for DL communications from the base station 705 to the UE 710. Accordingly, if the UE relies on a path-loss variable based on a measurement of a DL signal when calculating an UL power level for one of these scenarios, the resulting UL power level may be higher or lower than desired given the actual UL path-loss. Further, the UE 710 may use processing resources to perform power level calculations that ultimately are inaccurate because the calculations rely on a DL path-loss value for a DL communication from a device (e.g., the base station 705) that is different than the device that is to receive the UL communication (e.g., one of the UL Rx points 715, 720, 725).

As an example, the UE 710 may use the following UL power equation (equation 1) for determining an UL power level for an SRS resource set:

$$P_{SRS,b,f,c}(i, q_S, l) = \min\left\{\begin{matrix} P_{CMAX,f,c}(i) \\ P_{O\_SRS,b,f,c}(q_s) + 10\log_{10}(2^{\mu}\cdot M_{SRS,b,f,c}(i)) + \\ \alpha_{SRS,b,f,c}(q_s)\cdot PL_{b,f,c}(q_d) + h_{b,f,c}(i) \end{matrix}\right\}[dBm] \quad (1)$$

Here, b refers to UL bandwidth part; f refers to carrier frequency; c refers to serving cell; i refers to a transmission occasion; $P_{CMAX,f,c}(i)$ refers to a maximum UE output power level for the carrier frequency f of the serving cell c; $P_{O\_SRS,b,f,c}(q_S)$ refers to a power offset value; $PL_{b,f,c}$ $(q_d))$ refers to path-loss for the UL bandwidth part b of the carrier frequency f of the serving cell c: $\alpha_{SRS,b,f,c}(q_S)$ is a factor to vary the path-loss variable; and $h_{b,f,c}(i)$ is a power control adjustment state. In equation 1, $PL_{b,f,c}$ $(q_d)$ is based on a downlink reference signal (DL RS), such as a synchronization signal block (SSB) from the base station 705. For $h_{b,f,c}(i)$ for a particular SRS resource set, the UE 710 may be configured to use different power control adjustment states. For example, for $h_{b,f,c}(i)$. the UE 710 may use one of two PUSCH power control adjustment states maintained for PUSCH communications in equation 1 (in which case, an additional variable/is provided to indicate which state). Alternatively, for $h_{b,f,c}(i)$, the UE 710 may use an SRS power control adjustment state maintained specifically for SRS communications. For example, in the latter case, the SRS power control adjustment state $h_{b,f,c}(i)$ may be calculated using equation 2 as follows:

$$h_{b,f,c}(i) = h_{b,f,c}(i-i_0) + \sum_{m=0}^{c(S_i)-1} \delta_{SRS,b,f,c}(m) \quad (2)(2)$$

Here, $$\sum_{m=0}^{c(S_i)-1} \delta_{SRS,b,f,c}(m)$$

represents the accumulation of TPC command values δ for the SRS power control adjustment state.

The issues for UL power levels may be exacerbated in the case of SRS communications used for beam management in the RAN 702. In an UL dense deployment, beam management may refer to the process for selecting one or more of an UL Rx point, an UL transmit beam (for a scheduled entity), and an UL receive beam (for the UL Rx point). A network, such as the RAN 702, may use an SRS resource set as part of beam management. An SRS resource set may have a usage variable indicating the use or purpose of the SRS resource set. The usage parameter may be set to, for example, beam management, codebook, noncodebook, or antenna switching. When the SRS resource set is set to beam management (for example, the usage variable may be set to "beamManagement" or may otherwise have a value indicative of the beam management setting), the SRS resource set is intended to be used for beam management.

An SRS resource set may include one or more SRS resources, with each SRS resource of the SRS resource set referring to an UL communication of a reference signal (i.e., a sounding reference signal (SRS)). Each SRS resource may be associated with a particular directional transmit beam. For example, each SRS resource may have an associated pre-coding or codebook that is applied to transmit the SRS resource in a particular spatial direction. In some examples, an SRS resource set may include groups of SRS resources, such as shown in FIG. 7B.

In FIG. 7B, an SRS resource set 750 includes three SRS resource groups 752, 754, and 756, with each group having four SRS resources 758, resulting a total of twelve SRS resources 758. The particular quantities of SRS groups and SRS resources within each group are merely examples, and different quantities of each are used in other examples. In some examples, the UE 710 transmits each SRS resource in a particular SRS resource group in the same spatial direction (e.g., using the same transmit beam), and each SRS resource group is transmitted in a different spatial direction. Each receiving device, such as one or more of the UL Rx points 715, 720, 725, may use a different receive beam to receive each SRS resource 758 of an SRS resource group. Accordingly, each SRS resource of an SRS resource set may be associated with a different transmit beam-receive beam pair.

As an example, with reference to FIG. 7C, a portion of the RAN 702 is illustrated including the UE 710 and the UL Rx point 715. The UE 710 transmits the SRS resource set 750. The SRS resource group 752 is transmitted in a first spatial direction via transmit beam A, the SRS resource group 754 is transmitted in a second spatial direction via transmit beam B, and the SRS resource group 756 is transmitted in a third spatial direction via transmit beam C. The UL Rx point 715 may receive, or attempt to receive, each of the SRS resources 758. For example, the UL Rx point 715 includes four receive beams 760 (Rx beams A, B, C, and D), each of the receive beams 760 having a different spatial direction. In this example, the number of receive beams matches the number of SRS resources 758 per group in the SRS resource set 750. Accordingly, the UL Rx point 715 may receive each SRS resource 758 of a group (e.g., SRS resource group 752) using a different receive beam 760. In other examples, different and/or unequal numbers of transmit beams per group and receive beams are used. The UE 710 may transmit the SRS resources 758 in parallel, in series, or partially in parallel and in series.

FIG. 7D illustrates a sequence diagram of a beam management process 770 that may be implemented by the RAN 702, in some examples. FIG. 7D and the accompanying discussion provide an overview of some examples of a beam management process. Further details of a beam management process, such as the beam management process 770, are provided with respect to FIGS. 8 and 10.

In the beam management process 770, the base station 705 transmits a DL communication including an indication of a power spectral density 772 to the UE 710 for use in transmitting an SRS. The power spectral density indicates a power per resource unit. For example, the power spectral density may be a value expressed in terms of dBm per resource block (RB), dBm per resource element (RE), or dBm per frequency unit (e.g., dBm/megahertz). At block 774, the UE 710 determines a power level for an SRS based on the power spectral density indicated by the base station 705. In this example, the UE 710 may not determine the power level based on DL path-loss. Rather, the UE 710 may determine the power level using, for example, equation 3, equation 4, and variations thereof discussed in further detail below. The UE then transmits an SRS 776 at the determined power level. The SRS 776 is, for example, an SRS resource of an SRS resource set, such as SRS 758 of FIGS. 7B-7C. The SRS 776 may further have a usage variable set to beam management. The SRS 776 is received by at least the UL Rx point 715. In some examples, the SRS 776 may also be received by the base station 705 and/or one or more UL Rx points (e.g., UL Rx points 720 and/or 725).

At block 778, the UL Rx point 715 measures a power level of the received SRS 776. For example, the UL Rx point 715 includes a circuit to measure a power level of the SRS 776 at the point of reception at the UL Rx point 715. The UL Rx point 715 may determine the power level in terms of dBm based on the measurement. The UL Rx point 715 then transmits the measured power level as a measured SRS power level 780 to the base station 705 (e.g., over the backhaul connection 730*a*). At block 782, the base station 705 determines an UL configuration for the UE 710 based on the measured SRS power level 780. The UL configuration may include one or more of an indication of a selected transmit beam, a selected receive beam, and a selected UL Rx point (e.g., one of UL Rx point 715, 720, or 725).

The base station 705 may then transmit the UL configuration, or a portion thereof, to the UE 710 and to the UL Rx point 715. For example, the base station 705 may transmit one or more of an UL transmitter configuration 784 to the UE 710, an UL receiver configuration 788 to the UL Rx point 715, and an UL receiver selection 786 to the UL Rx point 715, each of which may be a portion of the UL configuration determined by the base station 705. The base station 705 may transmit these communications in parallel, in series, or partially in parallel and in series. The UL transmitter configuration 784 may indicate a selected transmit beam for the UE 710 to use in UL communications. The UL receiver configuration 788 may indicate a selected receive beam for the UL Rx point 715 to use to receive UL communications from the UE 710. The UL receiver selection 786 may indicate that the UL Rx point 715 was selected for receiving UL communications from the UE 710.

Then, the UE 710 transmits an UL communication 790 in accordance with the UL transmitter configuration 784. The UL communication 790 is received by the UL Rx point 715 in accordance with the UL receiver configuration 788.

FIG. 8 is a flow chart illustrating an exemplary process 800 for wireless communication and, more particularly, power control of UL communications in accordance with some aspects of the present disclosure. As described below, a particular implementation may omit some or all illustrated features, and may not require some illustrated features to implement all embodiments. In some examples, the scheduled entity 600 illustrated in FIG. 6 may be configured to carry out the process 800. Additionally, for purposes of illustration, the process 800 is described below with respect to the RAN 702 of FIGS. 7A-D. However, in some examples, any suitable apparatus or means for carrying out the functions or algorithm described below may carry out the process 800.

At block 805, the UE 710 receives an indication of a power spectral density for a sounding reference signal (SRS). The power spectral density may indicate power per resource unit. For example, the power spectral density may be a value expressed in terms of dBm per resource block (RB), dBm per resource element (RE), or dBm per frequency unit (e.g., dBm per megahertz (MHz)). With reference to FIG. 7, the UE 710 may receive the indication of the power spectral density from the base station 705. For example, the base station 705 may wirelessly transmit the indication via a DL communication to the UE 710.

In some examples, the indication of the power spectral density is an express value for the power spectral density. For example, the base station 705 may transmit a particular value (e.g., in terms of dBm/RB, dBm/RE, or dBm/MHz) to the UE 710. In some examples, the indication of the power spectral density includes an identifier or address that identifies a power spectral density value stored on the UE 710. For example, the UE 710 may store an indexed list of potential power spectral density values in a memory (see, e.g., the memory 605 of FIG. 6). In this example, the indication of the power spectral density may include an identifier or address that serves as an index to the list to identify one of the potential power spectral density values.

In some examples, the UE 710 receives the indication of the power spectral density in a medium access control (MAC) layer control element (MAC-CE) from the base station 705. For example, the MAC-CE may include an identifier for a power spectral density (a PSD ID) that identifies a particular power spectral density from a list of potential power spectral density values known to the UE 710 (e.g., stored on the UE 710). In some examples, the MAC-CE may further include an identifier for a particular SRS resource set (an SRS resource set ID) that identifies a particular SRS resource set from a list of potential SRS resource sets known to the UE 710. In some examples, the MAC-CE may further include an identifier for a particular serving cell (a serving cell ID) for the SRS resource set that identifies a particular serving cell from a list of potential serving cells known to the UE 710. In some examples, the MAC-CE may further include an identifier for a particular bandwidth part (a BWP ID) for the SRS resource set that identifies a particular bandwidth part from a list of potential bandwidth parts known to the UE 710 (e.g., stored on the UE 710).

Figure 9A:
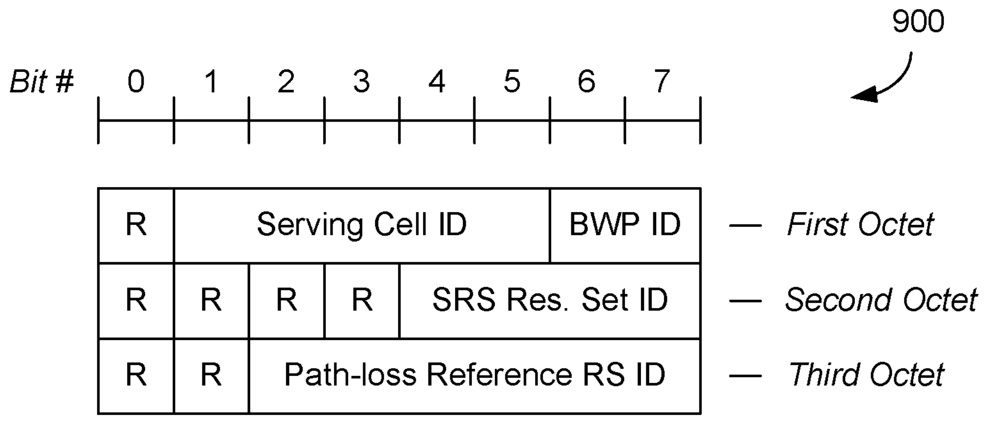
FIGS. 9A and 9B each illustrate a respective medium access control (MAC) control element (CE) format diagram according to some embodiments.
Figure 9B:
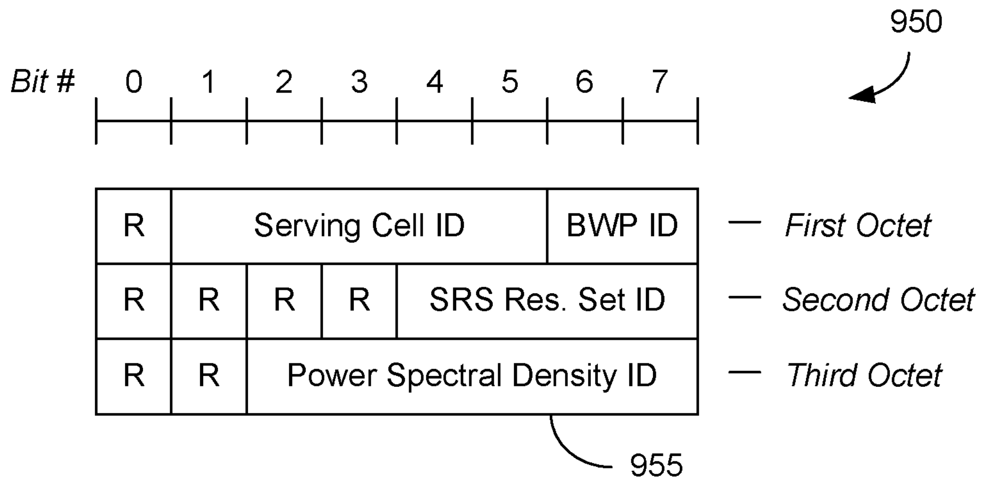

In some examples, the base station 705 indicates the power spectral density to the UE 710 using a MAC-CE format that is similar to a format that is typically used for indicating a path-loss reference signal (PL-RS) update for an SRS resource set. More particularly, FIG. 9A illustrates a MAC-CE format 900 for indicating a PL-RS update for an SRS resource set. The MAC-CE format 900 includes three octets. The first octet includes a reserved bit, a serving cell ID (five bits), and a BWP ID (two bits). The second octet includes four reserved bits and an SRS resource set ID (four bits). The third octet includes two reserved bits and a PL-RS ID (six bits). The base station 705 may modify the MAC-CE format 900 to indicate the power spectral density. For example, FIG. 9B illustrates a MAC-CE format 950 that is similar to the MAC-CE format 900 except that the MAC-CE format 950 indicates the power spectral density in the third octet, rather than the PL-RS ID. More particularly, the MAC-CE format 950 includes a PSD-ID 955 that identifies a particular power spectral density from a list of potential power spectral density values known to the UE 710. The base station 705 may transmit a MAC-CE in the MAC-CE format 950 to indicate the power spectral density.

The base station 705 may signal to the UE 710 whether a particular MAC-CE has the MAC-CE format 900 or the MAC-CE format 950. For example, the base station 705 may communicate in one or more radio resource control (RRC) communications to the UE 710 that the UE 710 should use a power spectral density value, rather than a PL-RS, for calculating an UL power level for an SRS resource set. Generally, RRC communications may be communications between a scheduling entity and a scheduled entity that enable configuring of user and control planes. Based on the received one or more RRC communications, when the UE 710 receives a MAC-CE, the UE 710 may interpret the MAC-CE as being in the MAC-CE format 950. Accordingly, the UE 710 may further be configured to interpret the PSD-ID 955 as a PSD-ID, rather than as a PL-RS ID like found in the MAC-CE format 900. In some examples, the base station 705 may use one or more of the reserved bits of the MAC-CE format 950 to communicate to the UE 710 that a transmitted MAC-CE has the MAC-CE format 950, rather than the MAC-CE format 900. Accordingly, when the UE 710 receives the MAC-CE with the appropriate bit set to indicate the MAC-CE format 950, the UE 710 is configured to interpret the PSD-ID 955 as a PSD-ID, rather than as a PL-RS ID like found in the MAC-CE format 900.

In some examples in which the base station 705 uses a MAC-CE to convey an identifier of a power spectral density from a list of power spectral densities known to the UE 710 (e.g., using the MAC-CE format 950), the base station 705 may also communicate the list of potential power spectral density values to the UE 710 via one or more RRC communications. For example, the base station 705 may communicate the list of potential power spectral density values to the UE 710 via one or more RRC communications in advance of sending a MAC-CE with the identifier. The base station may also indicate in the one or more RRC communications that the UE 710 should interpret a future MAC-CE as having the MAC-CE format 950, or another format in which the identifier is included.

In some examples, the base station 705 communicates the indication of the power spectral density in a downlink control information (DCI). For example, the DCI may include an identifier for a power spectral density (a PSD-ID) that identifies a particular power spectral density from a list of potential power spectral density values known to the UE 710 (e.g., stored on the UE 710). In some examples, the base station 705 may communicate the list of potential power spectral density values to the UE 710 via one or more RRC communications. Then, the base station 705 includes a PSD-ID in a DCI to identify one of these power spectral density values as the power spectral density. The DCI may be a group-common DCI (e.g., DCI format 2_3), a UE-specific DCI scheduling DL (DCI formats 1_1 or 1_2), or UL (DCI formats 0_1 or 0_2). In some examples, the power spectral density indicated by the DCI may remain valid and in use for SRS resource sets until another DCI changes the value.

In some examples, the base station 705 may communicate the list of potential power spectral density values to the UE 710 via one or more RRC communications. The base station 705 may further communicate a MAC-CE to identify a subset of potential power spectral density values from the list. Then, the base station 705 may transmit a DCI that includes a PSD-ID to identify one of the power spectral density values from the subset as the power spectral density. Thus, relative to the previous example, the base station 705 transmits an additional communication (i.e., a MAC-CE). However, by using the MAC-CE to identify a subset, fewer bits in a DCI can be used for a PSD ID to identify a power spectral density value from a larger list of potential values provided via RRC communication. In some examples, the power spectral density indicated by the DCI may remain valid and in use for SRS resource sets until another DCI changes the value.

At block 810, the UE 710 transmits, via a transceiver, the SRS at a power level that is based on the power spectral density. For example, the UE 710 may transmit, via a transceiver, the SRS at the power level. For example, the processor 604 and memory 605 may control the transceiver 610 to communicate the SRS. The UE 710 may transmit the SRS in a particular spatial direction. For example, the UE 710 may have or receive SRS configuration data that specifies a particular precoding or codebook weighting for the SRS. The UE 710 may use the precoding or codebook weighting to configure an antenna of the UE 710 for beamforming to transmit the SRS in a particular direction.

In some example, the UE 710 transmits additional SRS resources at the power level that is based on the power spectral density. For example, the UE 710 may transmit one or more additional SRS resources of an SRS resource group and/or SRS resource set of which the SRS is a part as the power level. In some examples, the SRS configuration data may include respective directional information for each SRS resource group or SRS resource individually. For example, the SRS configuration data may specify that the UE 710 transmit each SRS resource of an SRS resource group in the same spatial direction (e.g., within some suitable tolerance or range of each other). The SRS configuration data may be configured on the UE 710 by the base station 705 via RRC communications, MAC-CE communications, and/or DCI communications.

In some examples, to transmit the SRS at the power level, the UE 710 may determine the power level based on the power spectral density. For example, the UE 710 may replace one or more terms of the SRS power level equation provided above (equation 1) with the power spectral density or with the power spectral density scaled based on a bandwidth of the SRS. Accordingly, in some examples, the UE 710 may use the following SRS power level equation (equation 3):

$$P_{SRS,b,f,c}(i, q_S, l) = \min\left\{\begin{matrix} P_{CMAX,f,c}(i) \\ 10\log_{10}(2^{\mu} \cdot M_{SRS,b,f,c}(i)) + PSD \end{matrix}\right\}[dBm] \quad (3)$$

Here, PSD is the power spectral density, $M_{SRS}$ is the SRS bandwidth expressed in number of resource blocks (RBs), and μ corresponds to the applicable subcarrier spacing numerology. Accordingly, the SRS power level equation no longer includes the path-loss (PL) term of equation 1 and, thus, is no longer based on downlink path-loss. This SRS power level equation 3 also does not include the $P_O$ term, the alpha (a) factor, or the power control adjustment state h term. Accordingly, the UE 710 may perform the calculation using fewer processing resources (e.g., reducing power consumption and increasing processing speed) and without a path-loss term that could otherwise lead to inaccuracies.

In some further examples, when the power spectral density that is provided indicates power per full UL bandwidth, the UE 710 may use the following SRS power level equation (equation 4), which scales down the PSD value based on the actual scheduled RBs (or allocated bandwidth) for the SRS:

$$P_{SRS,b,f,c}(i, q_S, l) = \min\left\{\begin{matrix} P_{CMAX,f,c}(i) \\ 10\log_{10}(2^{\mu} \cdot M_{SRS,b,f,c}(i)) + \left(\frac{1}{SRS \text{ bandwith}}\right)PSD \end{matrix}\right\}[dBm] \quad (4)$$

In some examples, the PSD may be provided in terms of another bandwidth that is different than the actual scheduled SRS bandwidth, and a similar scaling operation as provided in equation 4 may be performed to calculate the SRS power level. Similar to equation 3, the UE 710 may calculate equation 4 using fewer processing resources (e.g., reducing power consumption and increasing processing speed relative to equation 1) and without a path-loss term that could otherwise lead to inaccuracies.

In the above examples of equations 3 and 4, the UE 710 does not include the power control adjustment state h term that is present in equation 1. As described above with respect to equation 1, the power control adjustment state h is, for example, an SRS closed loop power control adjustment state. The SRS closed loop power control adjustment state may be an offset in an uplink power level calculation for one or more other sounding reference signals (e.g., having a usage variable set to a value other than beam management). By not including the h term in the power calculation, the UE 710 negates influence of the SRS closed loop power control adjustment state on the power level for the SRS. Stated another way, the UE 710 determines the power level for the SRS independent of the SRS closed loop power control adjustment state. Thus, although the UE 710 is maintaining the power control adjustment state for SRS resources, the UE 710 is not using this power control adjustment state to influence the power level for the SRS in this case (e.g., when SRS usage variable is set to beam management). Additionally, because the UE 710 uses an equation or calculation that does not include the power control adjustment state for the SRS with usage variable set to beam management, the UE 710 does not modify the power control adjustment state for the SRS resources and the UE 710 may still use the power control adjustment state for SRS resources having other usages (e.g., codebook, noncodebook, or antenna switching). In other examples, one or both of equations 3 or 4 are modified to include the power control adjustment state (h) term that is also within equation 1. However, in these cases, and when the usage variable for the SRS is set to beam management, the UE 710 may reset the power control adjustment state maintained for SRS to zero (i.e., $h_{b,f,c}(i)=0$) before calculating the power level for the SRS. By setting this term ($h_{b,f,c}(i)$) to zero, the UE 710 negates influence of the SRS closed loop power control adjustment state on the power level for the SRS.

As noted, in block 810, the SRS may be an SRS resource of an SRS resource set. The SRS resource set and, thus, the SRS, may have a usage variable set to beam management, such as described above. In some examples, the UE 710 may further be configured to determine that the usage variable is set to beam management. The UE 710 may further determine, based on the usage variable being set to beam management, to calculate the power level for the SRS based on the power spectral density (e.g., using equation 3 or 4), rather than using equation 1.

In some examples of the process 800, the UE 710 may further be configured to receive a downlink reference signal and to measure a path-loss associated with the downlink reference signal. In some examples of the process 800, the UE 710 may further determine whether the path-loss value for the downlink reference signal exceeds a predetermined path-loss threshold. When the path-loss value exceeds the predetermined path-loss threshold, the UE 710 may proceed to execute block 810 as provided above, where the SRS is transmitted at the power level based on the power spectral density. In some examples, when the path-loss value is below the predetermined path-loss threshold, the UE 710 may transmit the SRS at a power level that is based on the path-loss value. For example, the UE 710 may calculate the power level for the SRS using equation 1 described above. The predetermined path-loss threshold may be selected to be a value that indicates whether the UE 710 is close to the base station 705 and, thus, the base station 705 is likely to also be the UL reception point (rather than an UL Rx point 715, 720, or 725).

In some examples of the process 800, after block 810, the UE 710 further receives an UL transmitter configuration from the base station 705 that is based on the SRS, such as the UL transmitter configuration 784 of FIG. 7D. The UL transmitter configuration 784 may indicate a transmit beam. In some examples, the transmit beam may have a particular spatial direction, a particular UL power level, or both that is indicated by the UL transmitter configuration. In some examples, the UL transmitter configuration may indicate a transmit beam by indicating a spatial direction (e.g., via a precoding or weighting for a codebook), an UL power level, or both.

The UE 710 may then transmit an UL communication to the UL Rx point 715 based on the UL transmitter configuration (see, e.g., UL communication 790 in FIG. 7D). For example, the UE 710 may transmit the UL communication using a transmit beam indicated by the UL transmitter configuration. For example, the UE 710 may transmit the UL communication in a direction and/or at UL power level indicated by the UL transmitter configuration.

In some examples, the UE 710 receives, via a transceiver, a power level adjustment command. The UE 710 may then transmit, via the transceiver, a further SRS at an adjusted power level that is based on the power level (used to transmit the SRS in block 810) and the power level adjustment command. For example, the UE 710 may maintain a power spectral density (PSD) adjustment state for SRS resources, SRS resource groups, and/or SRS resource sets having a usage variable set to beam management or otherwise indicated to use the power spectral density indicated in block 805 in an UL power level calculation. The PSD adjustment state may allow closed loop control of the power spectral density. For example, the PSD adjustment state may be an offset that the UE 710 adds to the power level calculated for SRS resources. The PSD adjustment state may be an accumulation of power level adjustment commands (e.g., received over a certain previous time period). The base station 705 may transmit the one or more PSD adjustment commands. For example, the base station 705 may transmit to the UE 710 one or more PSD adjustment commands via one or more DCI communications. Each power level adjustment command may indicate to increase, decrease or make no change to the PSD adjustment state. Accordingly, the base station 705 may transmit a power level adjustment command via a DCI communication, which the UE 710 receives. The UE 710 may then transmit the further SRS at the adjusted power level that is based on the power level (used to transmit the SRS in block 810) and the power level adjustment command. For example, the UE 710 may use equations 3 or 4 to determine the power level for the further SRS using the previously indicated power spectral density (indicated in block 805), and further add the PSD adjustment state as an offset. The further SRS may be an SRS resource of a further SRS resource group or further SRS resource set (i.e., different than the SRS resource group or set of the SRS transmitted in block 810).

In some examples, when the indication of the power spectral density is provided by a DCI, the UE 710 applies the indicated power spectral density to power calculations for SRS resources after a threshold time (e.g., in terms of number of symbols) after a last symbol of the DCI. In some examples, when the indication of the power spectral density is provided by a MAC-CE, the UE 710 applies the indicated power spectral density to power calculations for SRS resources after a threshold time (e.g., three milliseconds) after a HARQ-Ack for the PDSCH containing the MAC-CE.

Figure 10:
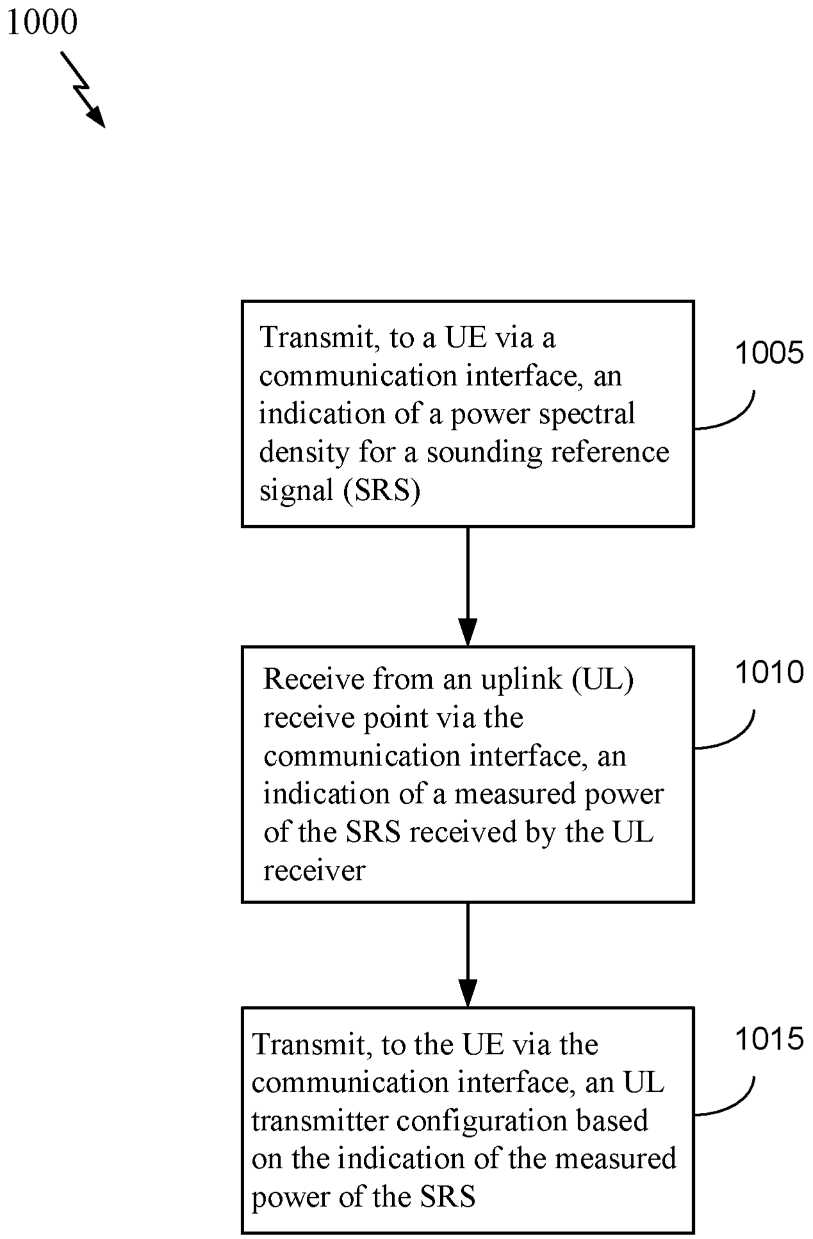
FIG. 10 is a flow chart illustrating another exemplary process for power control of uplink (UL) communication according to some embodiments.

FIG. 10 is a flow chart illustrating an exemplary process 1000 for wireless communication and, more particularly, for power control of UL communications in accordance with some aspects of the present disclosure. As described below, a particular implementation may omit some or all illustrated features, and may not require some illustrated features to implement all embodiments. In some examples, the network node 500 illustrated in FIG. 5 may be configured to carry out the process 1000. Additionally, for purposes of illustration, the process 1000 is described below with respect to the RAN 702 of FIGS. 7A-D. However, in some examples, any suitable apparatus or means for carrying out the functions or algorithm described below may carry out the process 1000.

At block 1005, the base station 705 transmits, to the UE 710 via a communication interface, an indication of a power spectral density for a sounding reference signal (SRS). The power spectral density may indicate power per resource unit. The base station 705 may, for example, retrieve the indication of the power spectral density from a memory (e.g., the memory 505 of FIG. 5) for transmission. The base station 705 may wirelessly communicate the indication of a power spectral density to the UE 710 via a transceiver of the communication interface (e.g., the transceiver 510 of the communication interface 509 of FIG. 5). The base station 705 may transmit the indication via a downlink (DL) communication to the UE 710, such as described above with respect to the indication 772 of FIG. 7D. For example, the base station 705 may transmit the indication to the UE 710 as part of a MAC-CE communication or as part of a DCI communication, as described above with respect to block 805.

As also described above with respect to block 805, in some examples, the indication of the power spectral density includes an express value for power spectral density or includes an identifier or address that identifies a power spectral density value stored on the UE 710.

As previously noted with respect to FIG. 7D and block 810 of FIG. 8, the UE may then transmit an SRS based on the power spectral density, which may be received by one or more UL receive points (e.g., UL Rx points 715, 720, and/or 725).

At block 1010, the base station 705 receives, from an uplink (UL) receive point (e.g., the UL Rx point 715) via the communication interface, an indication of a measured power of the SRS received by the UL receive point. See, for example, the measured SRS power level 780 transmitted by the UL Rx point 715 to the base station 705 in FIG. 7D. The base station 705 may receive the indication of the measured power of the SRS over a backhaul connection (see, e.g., backhaul connection 730*a* of FIG. 7A). In some examples, the indication of a measured power of the SRS may be one indication of a plurality of indications of measured power for one or more SRS resources. For example, the SRS transmitted by the UE 710 may be received by more than one UL Rx point. In such cases, each of the UL Rx points that receives the SRS may measure a respective SRS power level at the point of reception (i.e., at that UL Rx point). The SRS power level may be different at each UL Rx point, as the distance and path between the UE 710 and each UL Rx point may be different. Each UL Rx point may then provide an indication to the base station 705 of the measured SRS power level from the vantage of the particular UL Rx point. In some examples, the UE 710 may transmit a plurality of SRS resources in addition to the noted SRS (e.g., in addition to the SRS 776 shown in FIG. 7D), such as shown with respect to FIGS. 7B-7C. Each such additional SRS resource may result in a further indication (or indications) of measured power from UL Rx points that receive the additional SRS resources.

At block 1015, the base station 705 transmits, to the UE 710 via the communication interface, an UL transmitter configuration based on the indication of the measured power of the SRS. For example, the base station 705 may transmit the UL transmitter configuration to the UE 710 via a transceiver of the communication interface (see, e.g., the transceiver 510 of the communication interface 509).

The UL transmitter configuration may be a portion of an UL configuration that the base station 705 may determine based on the measured SRS power level indicated by the UL receive point. For example, the base station 705 may analyze the one or more indications of measured power received in block 1010 for the one or more SRS resources. Based on the analysis, the base station 705 may identify a transmit beam, receive beam, and/or UL Rx point to be used for one or more UL communication by the UE 710. For example, the base station 705 may identify a highest measured power of the measured powers of SRS resources indicated by the indications received in block 1010. The base station 705 may further identify the SRS resource, UL Rx point, transmit beam, and receive beam associated with the highest measured power. The base station 705 may then assign the transmit beam, receive beam, and UL Rx point associated with the highest measured power to the UL configuration.

Further, the base station 705 may assign or associate one or more of (i) the transmit beam to the UL transmitter configuration of the UL configuration, (ii) the receive beam to the UL receiver configuration of the UL configuration, and (ii) the UL Rx point to the UL receiver selection of the UL configuration. Accordingly, by transmitting the UL transmitter configuration, the base station 705 may indicate to the UE 710 the transmit beam that the UE 710 should use for future UL communications (see, e.g., UL communication 790 of FIG. 7D).

In some examples, the base station 705 may further transmit the UL receiver selection and/or the UL receiver configuration to the UL Rx point (see, e.g., UL receiver selection 786 and UL receiver configuration 788, respectively, of FIG. 7D). By transmitting the UL receiver configuration, the base station 705 may indicate to the UL receive point (e.g., UL Rx point 715) the receive beam that the UL receive point should use for one or more future UL communications from the UE 710 (see, e.g., UL communication 790 of FIG. 7D). By transmitting the UL receiver selection, the base station 705 may indicate to the UL receive point (e.g., UL Rx point 715) that the UL receive point has been selected to receive one or more future UL communications from the UE 710 (see, e.g., UL communication 790 of FIG. 7D).

In some examples, the base station 705 receives the one or more future UL communications, which are transmitted by the UE 710 according to the UL transmitter configuration, from the UL receive point over a backhaul connection (e.g., from the UL Rx point 715 over the backhaul connection **730*a***).

In some examples, the base station 705 uses other factors in addition to or instead of the highest measured power to determine the UL configuration. For example, the base station 705 may also consider current resource usage of a particular UL Rx point, potential for interference from other UEs, or other factors beyond highest measured power.

In some examples, the base station 705 transmits, to the UE 710 via the communication interface, a power level adjustment command. The power level adjustment command indicates to the UE 710 to adjust an SRS power level adjustment state. As described above, the UE 710 may calculate an adjusted power level for a further SRS that is based on the power level (used to transmit the SRS previously) and the power level adjustment command. The base station 705 may transmit the power level adjustment command as part of a DCI, as described above with respect to process 800 of FIG. 8. As also described above, the power level adjustment command may indicate to increase, decrease, or make no change to a PSD adjustment state for SRS resources, SRS resource groups, and/or SRS reference sets having a usage variable set to beam management or otherwise indicated to use the power spectral density indicated in block 805 in an UL power level calculation. The UE 710 may then transmit the further SRS at the adjusted power level.

Although the above description is provided with respect to sounding reference signals (SRSs), in some examples, the base station 705 indicates to the UE 710 a PSD for use in determining a power level for PUSCH communications, for PUCCH communications, and/or for PRACH (for connected node) communications.

Further Examples Having a Variety of Features

Example 1: A method, apparatus, and non-transitory computer-readable medium for receiving, via a transceiver, an indication of a power spectral density for a sounding reference signal (SRS); and transmitting, via the transceiver, the SRS at a power level that is based on the power spectral density.

Example 2: A method, apparatus, and non-transitory computer-readable medium of Example 1, wherein the power spectral density is expressed as one or more of power per resource block, power per resource element, or power per frequency unit.

Example 3: A method, apparatus, and non-transitory computer-readable medium of any of Examples 1 to 2, further including executing the transmission, via the transceiver, of the SRS at the power level when a usage parameter for the SRS is set to beam management to indicate that the SRS is to be used for beam management.

Example 4: A method, apparatus, and non-transitory computer-readable medium of any of Examples 1 to 3, further including receiving, via the transceiver, a downlink reference signal; and executing the transmission, via the transceiver, of the SRS at the power level based on a path-loss value for the downlink reference signal exceeding a predetermined path-loss threshold.

Example 5: A method, apparatus, and non-transitory computer-readable medium of any of Examples 1 to 4, further including storing a plurality of power spectral density values, wherein the indication of the power spectral density identifies one of the plurality of power spectral density values.

Example 6: A method, apparatus, and non-transitory computer-readable medium of any of Examples 1 to 5, wherein the indication is provided as part of one or more of a medium access control control element (MAC-CE) communication or a downlink control information (DCI) communication.

Example 7: A method, apparatus, and non-transitory computer-readable medium of any of Examples 1 to 6, further including maintaining an SRS closed loop power control adjustment state, wherein the SRS closed loop power control adjustment state is an offset in an uplink power level calculation for one or more other sounding reference signals; and one or more of (i) determining the power level for the SRS independent of the SRS closed loop power control adjustment state, or resetting the SRS closed loop power control adjustment state to zero before determining the power level for the SRS.

Example 8: A method, apparatus, and non-transitory computer-readable medium of any of Examples 1 to 7, further including receiving, via the transceiver, a power level adjustment command; and transmitting, via the transceiver, a further SRS at an adjusted power level that is based on the power level and the power level adjustment command.

Example 9: A method, apparatus, and non-transitory computer-readable medium of Example 8, wherein the indication is provided as part of a medium access control control element (MAC-CE) communication and the power level adjustment command is provided as part of a downlink control information (DCI) communication.

Example 10: A method, apparatus, and non-transitory computer-readable medium for transmitting, to a user equipment (UE) via a communication interface, an indication of a power spectral density for a sounding reference signal (SRS); receiving, from an uplink (UL) receive point via the communication interface, an indication of a measured power of the SRS received by the UL receive point; and transmitting, to the UE via the communication interface, an UL transmitter configuration based on the indication of the measured power of the SRS.

Example 11: A method, apparatus, and non-transitory computer-readable medium of Example 10, further including transmitting, to the UL receive point via the communication interface, an UL receiver configuration based on the indication of the measured power of the SRS.

Example 12: A method, apparatus, and non-transitory computer-readable medium of any of Examples 10 to 11, further including transmitting, to the UL receive point via the communication interface, a receiver selection indication that indicates that the UL receive point is selected for receiving an UL communication from the UE.

Example 13: A method, apparatus, and non-transitory computer-readable medium of any of Examples 10 to 12, wherein the power spectral density is expressed as one or more of a power per resource block, power per resource element, and power per frequency unit.

Example 14: A method, apparatus, and non-transitory computer-readable medium of any of Examples 10 to 13, wherein the indication of the power spectral density identifies one of a plurality of power spectral density values stored on the UE.

Example 15: A method, apparatus, and non-transitory computer-readable medium of any of Examples 10 to 14, wherein the indication is provided as part of one or more of a medium access control control element (MAC-CE) communication or a downlink control information (DCI) communication.

Example 16: A method, apparatus, and non-transitory computer-readable medium of any of Examples 10 to 15, further including transmitting, to the UE via the communication interface, a power level adjustment command to indicate, for a further SRS, an adjusted power level that is based on the power level and the power level adjustment command.

Example 17: A method, apparatus, and non-transitory computer-readable medium of any of Examples 10 to 16, wherein the indication is provided as part of a medium access control control element (MAC-CE) communication and the power level adjustment command is provided as part of a downlink control information (DCI) communication.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication, comprising:

a processor;

a transceiver communicatively coupled to the processor; and a memory communicatively coupled to the processor, wherein the apparatus is configured to:

store a plurality of power spectral density values;

receive, via the transceiver, an indication of a power spectral density for a sounding reference signal (SRS), wherein the indication identifies a power spectral density value representing a power per resource unit, wherein the power spectral density value is one of the plurality of power spectral density values; and transmit, via the transceiver, the SRS at a power level that is based on the power spectral density value.

2. The apparatus of claim 1, wherein the resource unit comprises a resource block, a resource element, or a frequency unit.

3. The apparatus of claim 1, wherein the apparatus is further configured to execute the transmission, via the transceiver, of the SRS at the power level when a usage parameter for the SRS is set to beam management to indicate that the SRS is to be used for beam management.

4. The apparatus of claim 1, wherein the apparatus is further configured to receive, via the transceiver, a downlink reference signal; and execute the transmission, via the transceiver, of the SRS at the power level based on a path-loss value for the downlink reference signal exceeding a predetermined path-loss threshold.

5. The apparatus of claim 1, wherein the indication is provided as part of one or more of a medium access control control element (MAC-CE) communication or a downlink control information (DCI) communication.

6. The apparatus of claim 1, wherein the apparatus is further configured to maintain an SRS closed loop power control adjustment state, wherein the SRS closed loop power control adjustment state is an offset in an uplink power level calculation for one or more other sounding reference signals; and one or more of determine the power level for the SRS independent of the SRS closed loop power control adjustment state, or reset the SRS closed loop power control adjustment state to zero before determining the power level for the SRS.

7. The apparatus of claim 1, wherein the apparatus is further configured to receive, via the transceiver, a power level adjustment command; and transmit, via the transceiver, a further SRS at an adjusted power level that is based on the power level and the power level adjustment command.

8. The apparatus of claim 7, wherein the indication is provided as part of a medium access control control element (MAC-CE) communication and the power level adjustment command is provided as part of a downlink control information (DCI) communication.

9. A method for wireless communication, comprising:

storing a plurality of power spectral density values;

receiving, via a transceiver, an indication of a power spectral density for a sounding reference signal (SRS), wherein the indication identifies a power spectral density value representing a power per resource unit, wherein the power spectral density value is one of the plurality of power spectral density values; and transmitting, via the transceiver, the SRS at a power level that is based on the power spectral density value.

10. The method of claim 9, wherein the resource unit comprises a resource block, a resource element, or a frequency unit.

11. The method of claim 9, further comprising:

executing the transmission of the SRS at the power level when a usage parameter for the SRS is set to beam management to indicate that the SRS is to be used for beam management.

12. The method of claim 9, further comprising:

receiving a downlink reference signal; and executing the transmission of the SRS at the power level based on a path-loss value for the downlink reference signal exceeding a predetermined path-loss threshold.

13. The method of claim 9, further comprising:

maintaining an SRS closed loop power control adjustment state, wherein the SRS closed loop power control adjustment state is an offset in an uplink power level calculation for one or more other sounding reference signals; and one or more of determining the power level for the SRS independent of the SRS closed loop power control adjustment state, or resetting the SRS closed loop power control adjustment state to zero before determining the power level for the SRS.

14. The method of claim 9, further comprising:

receiving a power level adjustment command; and transmitting a further SRS at an adjusted power level that is based on the power level and the power level adjustment command.

15. An apparatus for wireless communication, comprising:

a processor;

a communication interface communicatively coupled to the processor; and a memory communicatively coupled to the processor, wherein the apparatus is configured to:

transmit, to a user equipment (UE) via the communication interface, an indication of a power spectral density for a sounding reference signal (SRS), wherein the indication identifies a power spectral density value representing a power per resource unit, and wherein the power spectral density value is one of a plurality of power spectral density values stored on the UE;

receive, from an uplink (UL) receive point via the communication interface, an indication of a measured power of the SRS received by the UL receive point, wherein the SRS is transmitted at a power level that is based on the power spectral density value; and transmit, to the UE via the communication interface, an UL transmitter configuration based on the indication of the measured power of the SRS.

16. The apparatus of claim 15, wherein the apparatus is further configured to:

transmit, to the UL receive point via the communication interface, an UL receiver configuration based on the indication of the measured power of the SRS.

17. The apparatus of claim 15, wherein the apparatus is further configured to:

transmit, to the UL receive point via the communication interface, a receiver selection indication that indicates that the UL receive point is selected for receiving an UL communication from the UE.

18. The apparatus of claim 15, wherein the resource unit comprises a resource block, a resource element, or a frequency unit.

19. The apparatus of claim 15, wherein the indication is provided as part of one or more of a medium access control control element (MAC-CE) communication or a downlink control information (DCI) communication.

20. The apparatus of claim 15, wherein the apparatus is further configured to:

transmit, to the UE via the communication interface, a power level adjustment command to indicate, for a further SRS, an adjusted power level that is based on the power level and the power level adjustment command.

21. The apparatus of claim 20, wherein the indication is provided as part of a medium access control control element (MAC-CE) communication and the power level adjustment command is provided as part of a downlink control information (DCI) communication.

22. A method for wireless communication, comprising:

transmitting, to a user equipment (UE), an indication of a power spectral density for a sounding reference signal (SRS), wherein the indication identifies a power spectral density value representing a power per resource unit, and wherein the power spectral density value is one of a plurality of power spectral density values stored on the UE;

receiving, from an uplink (UL) receive point, an indication of a measured power of the SRS received by the UL receive point, wherein the SRS is transmitted at a power level that is based on the power spectral density value; and transmitting, to the UE, an UL transmitter configuration based on the indication of the measured power of the SRS.

23. The method of claim 22, further comprising:

transmitting, to the UL receive point, one or more of an UL receiver configuration based on the indication of the measured power of the SRS, or a receiver selection indication that indicates that the UL receive point is selected for receiving an UL communication from the UE.

24. The method of claim 22, wherein the resource unit comprises a resource block, a resource element, or a frequency unit.

25. The method of claim 22, further comprising:

transmitting, to the UE, a power level adjustment command to indicate, for a further SRS, an adjusted power level that is based on the power level and the power level adjustment command.

26. The method of claim 25, wherein the indication is provided as part of a medium access control control element (MAC-CE) communication and the power level adjustment command is provided as part of a downlink control information (DCI) communication.

* * * * *